(12) United States Patent
Nishikiori et al.

(10) Patent No.: US 8,468,988 B2
(45) Date of Patent: Jun. 25, 2013

(54) VARIABLE VALVE OPERATING APPARATUS FOR INTERNAL COMBUSTION ENGINE

(75) Inventors: Takashi Nishikiori, Susono (JP); Yasuyuki Shibata, Susono (JP); Shinya Misaka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 188 days.

(21) Appl. No.: 13/142,664

(22) PCT Filed: Feb. 25, 2009

(86) PCT No.: PCT/JP2009/053441
§ 371 (c)(1),
(2), (4) Date: Jun. 29, 2011

(87) PCT Pub. No.: WO2010/097918
PCT Pub. Date: Sep. 2, 2010

(65) Prior Publication Data
US 2011/0271918 A1    Nov. 10, 2011

(51) Int. Cl.
*F01L 1/34* (2006.01)
(52) U.S. Cl.
USPC ............ 123/90.16; 123/90.31; 123/90.39; 123/90.44; 74/569
(58) Field of Classification Search
USPC ........ 123/90.16, 90.31, 90.39, 90.44; 74/567, 74/569
See application file for complete search history.

(56) References Cited

U.S. PATENT DOCUMENTS

| | | | | |
|---|---|---|---|---|
| 7,565,887 B2 * | 7/2009 | Tsuruta et al. | ............. | 123/90.16 |
| 2003/0217728 A1 | 11/2003 | Hasebe et al. | | |

FOREIGN PATENT DOCUMENTS

| | | |
|---|---|---|
| JP | 7 189839 | 7/1995 |
| JP | 2000 154707 | 6/2000 |
| JP | 2003 343229 | 12/2003 |
| JP | 2004 28280 | 1/2004 |
| JP | 2007 32556 | 2/2007 |

OTHER PUBLICATIONS

International Search Report Issued Mar. 24, 2009 in PCT/JP09/053441 filed Feb. 25, 2009.

* cited by examiner

*Primary Examiner* — Ching Chang
(74) *Attorney, Agent, or Firm* — Oblon, Spivak, McClelland, Maier & Neustadt, L.L.P.

(57) ABSTRACT

Provided is a variable valve operating apparatus for an internal combustion engine, which can favorably reduce electric power consumption in a vehicle system that may stop the internal combustion engine during power-up of the vehicle system.

A changeover mechanism 90 is provided which is capable of switching between a connection state in which a first rocker arm 96 and a second rocker arm 98 are in connection with each other via a changeover pin 112, 118 and a disconnection state in which the connection is released. The changeover mechanism 90 performs energization of actuators 130 for each cylinder in a case in which fuel supply to the internal combustion engine 12 is stopped in response to an establishment of a predetermined stop condition. The above-described energization of the actuator 130 for each cylinder is stopped in a case in which a crankshaft 78 of the internal combustion engine 12 stops rotating during an energization time period of the actuator 130 and in which the crankshaft 78 is not driven by an external power.

8 Claims, 16 Drawing Sheets

Rotational direction of cam

VARIABLE VALVE OPERATING APPARATUS FOR INTERNAL COMBUSTION ENGINE

TECHNICAL FIELD

The present invention relates to a variable valve operating apparatus for an internal combustion engine, and particularly to a variable valve operating apparatus for an internal combustion engine suitable for use with an internal combustion engine that may stop fuel injection during power-up of a vehicle system.

BACKGROUND ART

So far, for example, Patent Document 1 discloses a control apparatus for a hybrid vehicle which is equipped with an internal combustion engine and a motor/generator directly connected to the internal combustion engine as its power source. The conventional internal combustion engine is provided with an intake and exhaust control apparatus which is capable of stopping intake and exhaust valves for all cylinders in a closed state. Also, an arrangement is made such that pumping loss of the internal combustion engine is reduced by stopping the intake and exhaust valves in the closed state in a case in which a vehicle running is performed by only a driving force of the motor/generator without using a driving force of the internal combustion engine (at the time of cylinder-cutoff-motor-running mode).

In addition, so far, for example, Patent Document 2 discloses a variable valve operating mechanism which is capable of changing a valve lift amount of an internal combustion engine by use of an electrically-driven actuator (solenoid).

[Patent Document 1] Japanese Laid-open Patent Application Publication No. 2004-28280

[Patent Document 2] Japanese Laid-open Patent Application Publication No. 2007-32556

DISCLOSURE OF INVENTION

Problem to be Solved by the Invention

Meanwhile, in the hybrid vehicle according to the above described Patent Document 1, a configuration may be adopted which stops the intake and exhaust valves in the closed state by use of a variable valve operating apparatus whose drive source is an electrically-driven actuator. However, if the variable valve operating apparatus used for such configuration is an apparatus necessary to keep energization of the electrically-driven actuator in order to maintain the intake and exhaust valves in the closed state, an increase in operating time of the vehicle system in a stopped state of the internal combustion engine (running time by the motor/generator or pause time of the vehicle) results in an increase in energization time of the electrically-driven actuator. As a result of this, there is a concern that fuel economy of the internal combustion engine deteriorates.

The present invention has been made to solve the problem as described above, and has its object to provide a variable valve operating apparatus for an internal combustion engine which can favorably reduce electric power consumption in a vehicle system that may stop the internal combustion engine during power-up of the vehicle system.

Means for Solving the Problem

A first aspect of the present invention is a variable valve operating apparatus for an internal combustion engine, the variable valve operating apparatus that is used for the internal combustion engine the automatic stop in a case in which a predetermined stop condition is established during power-up of a vehicle system, while automatically restarting in a case in which a predetermined restart condition is established, and that is capable of changing operational states of at least one valve of an intake valve and an exhaust valve between a valve operable state and a valve stop state in each cylinder of the internal combustion engine, the variable valve operating apparatus comprising:

a first rocker arm which oscillates in synchronicity with a cam of the internal combustion engine;

a second rocker arm which is capable of pressing the intake valve or the exhaust valve; and a changeover mechanism which includes a changeover pin disposed to be insertable to a pin hole formed in the first rocker arm and the second rocker arm respectively, and which is capable of switching between a connection state in which the first rocker arm and the second rocker arm are in connection with each other via the changeover pin and a disconnection state in which the connection is released, wherein the changeover mechanism includes an electrically-driven actuator which performs an operation to move the changeover pin directly or indirectly, wherein the changeover mechanism creates the connection state during de-energization of the actuator and maintains the disconnection state by keeping the actuator energized, wherein the variable valve operating apparatus comprises energization control means which performs energization of the actuator for each cylinder in a case in which fuel supply to the internal combustion engine is stopped in response to an establishment of the stop condition, and wherein the energization control means includes energization stop execution means that stops the energization of the actuator for each cylinder in a case in which a crankshaft of the internal combustion engine stops rotating during an energization time period of the actuator and in which the crankshaft is not driven by an external power.

A second aspect of the present invention is the variable valve operating apparatus for the internal combustion engine according to the first aspect of the present invention, wherein the changeover mechanism includes:

biasing means which biases the changeover pin toward a position in the connection state from a position in the disconnection state; and a pin driving mechanism which displaces, with an aid of a rotative power of the cam, the changeover pin to the position in the disconnection state from the position in the connection state against a biasing force generated by the biasing means in response to an operation of the actuator at an energization, wherein the pin driving mechanism is arranged such that when the energization of the actuator is stopped, a force to press the changeover pin toward the position in the disconnection state disappears, and wherein the variable valve operating apparatus further comprises:

stop position determination means which determines a piston stop position of each cylinder in a stopped state of the internal combustion engine; and restart execution means which executes a start-up from a cylinder at which an intake stroke first arrives when the internal combustion engine restarts in response to an establishment of the restart condition.

A third aspect of the present invention is the variable valve operating apparatus for the internal combustion engine according to the first aspect of the present invention, the apparatus further comprising:

wherein the variable valve operating apparatus is an apparatus which is capable of changing the operational states of both the intake valve and the exhaust valve between the valve operable state and the valve stop state in each cylinder of the internal combustion engine, wherein the changeover mechanism includes:

biasing means which biases the changeover pin toward a position in the connection state from a position in the disconnection state; and a pin driving mechanism which displaces, with an aid of a rotative power of the cam, the changeover pin to the position in the disconnection state from the position in the connection state against a biasing force generated by the biasing means in response to an operation of the actuator at an energization, wherein the pin driving mechanism is arranged such that when the energization of the actuator is stopped, a force to press the changeover pin toward the position in the disconnection state disappears, wherein the variable valve operating apparatus further comprises cylinder pressure determination means which determines whether or not a cylinder pressure in at least one cylinder of the internal combustion engine is equal to or less than a predetermined value after the crankshaft stops rotating during the energization time period, and wherein the energization stop execution means includes energization continuation execution means which maintains the energization of the actuator for each cylinder in a case in which the cylinder pressure in the at least one cylinder is equal to or less than the predetermined value after the crankshaft stops rotating during the energization time period.

A fourth aspect of the present invention is the variable valve operating apparatus for the internal combustion engine according to the third aspect of the present invention, wherein the energization control means includes energization order setting means which performs the energization of the actuators for each cylinder in order of the actuator playing a role in controlling the intake valve to the actuator playing a role in controlling the exhaust valve in a case in which the fuel supply to the internal combustion engine is stopped in response to the establishment of the stop condition, and wherein the variable valve operating apparatus is set so that a closing timing of the exhaust valve when the exhaust valve is stopped by the energization of the actuator becomes a timing near a top dead center.

A fifth aspect of the present invention is the variable valve operating apparatus for the internal combustion engine according to any one of the second to fourth aspects of the present invention, wherein the variable valve operating apparatus is an apparatus which is capable of changing the operational states of at least the exhaust valve of the intake valve and the exhaust valve between the valve operable state and the valve stop state on a cylinder to cylinder basis in each cylinder of the internal combustion engine, and wherein the energization control means includes exhaust side energization continuation execution means that maintains the energization of the actuator playing a role in controlling the exhaust valve for a cylinder in which a piston is put in at least any of a compression stroke and an expansion stroke out of the compression stroke, the expansion stroke and an intake stroke when the crankshaft stops rotating during the energization time period.

Advantages of the Invention

According to the first aspect of the present invention, if the fuel supply to the internal combustion engine is stopped, at least one of the intake valve and the exhaust valve in each cylinder is in a closed state by performing the energization of the actuator of each cylinder. This makes it possible to prevent fresh air from being supplied to a catalyst which is disposed in an exhaust passage in the process of stopping the internal combustion engine, and to avoid the catalyst from deteriorating when the temperature of the catalyst is high. On that basis, according to the present invention, the energization of the actuator for each cylinder is stopped in the case in which the crankshaft of the internal combustion engine stops rotating during an energization time period of the actuator and in which the crankshaft is not driven by an external power. If the energization of the actuator is stopped after the confirmation of the fact that the crankshaft has stopped rotating as just described, air does not flow toward the catalyst. Therefore, the present invention can favorably reduce electric power consumption, while preventing the catalyst from deteriorating in the process of stopping the internal combustion engine.

According to the configuration of the changeover mechanism of the second aspect of the present invention, if the energization of the actuator is stopped in a state in which the changeover pin is displaced to the position in the connected state, the changeover pin comes to be returned toward the position in the disconnected state by the biasing force generated by the biasing means. As a result of this, in order to displace the changeover pin to the position of the connected state by performing the energization of the actuator after that, it is needed to wait until the cam rotates at the time of the restart of the internal combustion engine. According to the present invention including the changeover mechanism of such configuration, the arrangement is made such that a start-up is executed from a cylinder at which the intake stroke first arrives. Because of this, it becomes possible to avoid fresh air from being supplied to the catalyst at the time of the restart. Therefore, the present invention makes it possible to surely prevent the catalyst from deteriorating at the time of the stop and the restart, while successfully reducing electric power consumption by the control according to the above-described first aspect of the present invention.

According to the third aspect of the present invention, even if the changeover mechanism having the same configuration as the above-described second aspect of the present invention is provided, keeping the energization of the actuator for each cylinder can prevent the return to a valve operable state from being performed at the first cycle of each cylinder after the restart. As a result of this, it becomes possible to prevent air from being not introduced into cylinders at which the intake stroke arrives during the first cycle, and thus the pressure within the combustion chambers of those cylinders can be maintained to be low successfully. This makes it possible to successfully reduce a load needed for cranking compared with a case of returning to the valve operable state at the first cycle after the restart.

The fourth aspect of the present invention can allow the pressure within the combustion chamber to efficiently become negative at the time of the stop of the internal combustion engine. This makes is possible to draw out effects by the above-described third aspect of the present invention more sufficiently.

According to the fifth aspect of the present invention, even if the changeover mechanism having the same configuration as the above-described second to fourth aspects of the present invention is provided, it becomes possible to surely prevent the air, which is sucked up to the combustion chamber from the crank chamber side during the stop of the internal combustion engine, from being supplied to the catalyst from each cylinder at the time of the restart.

Figure 1:
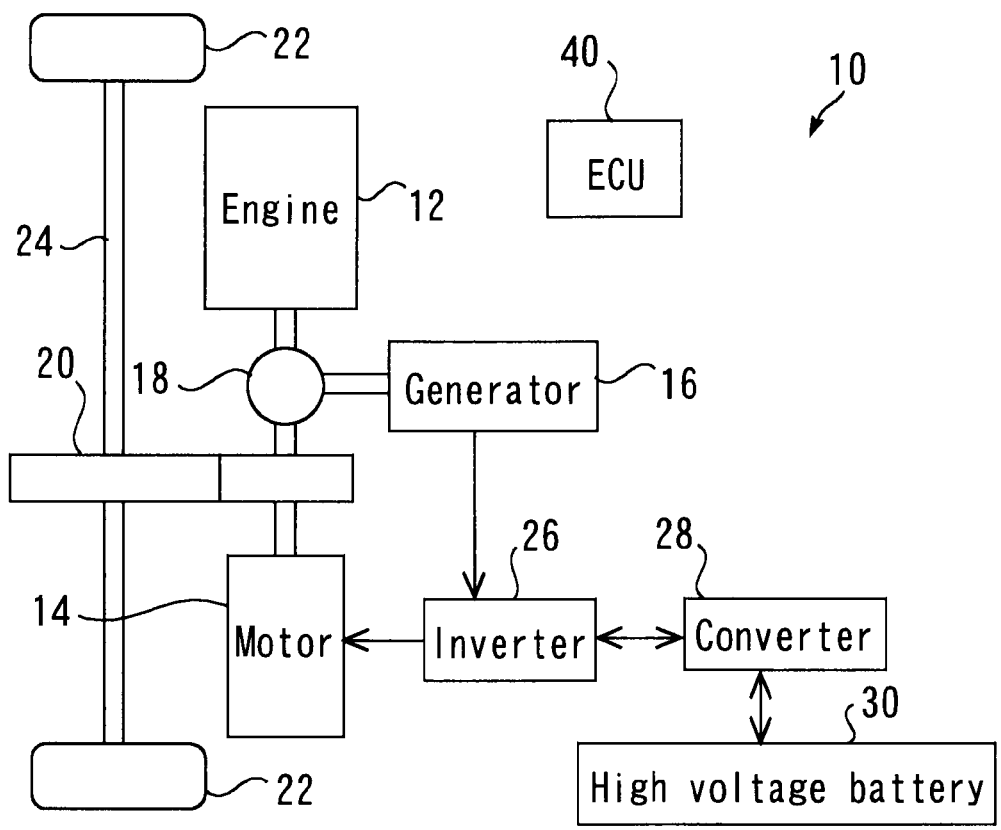
FIG. 1 is a diagram for showing a schematic configuration of a drive system for a hybrid vehicle to which the present invention is applied.

DESCRIPTION OF SYMBOLS 10 drive system
12 internal combustion engine
14 motor
16 generator
18 power dividing mechanism
22 drive wheel
40 Electronic Control Unit (ECU)
42 piston
44 combustion chamber
46 intake passage
48 exhaust passage
54 fuel injection valve
56 ignition plug
58 intake valve
60 exhaust valve
62 intake variable valve operating apparatus
64 exhaust variable valve operating apparatus
66 catalyst
70 crank angle sensor
74 cylinder pressure sensor
76 IG switch
78 crankshaft
80 camshaft
82 main cam
82a base circle part
82b nose part
84 auxiliary cam
86 variable mechanism
90 changeover mechanism
92 cam angle sensor
96 first rocker arm
98L, 98R second rocker arm
110 first pin hole
112 first changeover pin
116L, 116R second pin hole
118L, 118R second changeover pin
120 return spring
122 slide pin
122a circular column part
122b arm part
122c projection part
122d pressing surface
122e notch part
122f guide surface
126 large diameter part
128 guide rail
128a proximal end
128b terminal end
128c shallow bottom part
130 actuator
132 solenoid
132a drive axis
134 lock pin
Pmax1 displacement end
Pmax2 displacement end

BEST MODE FOR CARRYING OUT THE INVENTION

First Embodiment

[Configuration of HV System]

FIG. 1 is a diagram for showing a schematic configuration of a drive system 10 for a hybrid vehicle to which the present invention is applied. The drive system 10 includes an internal combustion engine 12 and a vehicle driving motor (hereinafter simply referred to as a "motor") 14 as power sources of the vehicle. The drive system 10 also includes a generator 16 that receives a supply of a drive force and generates electric power. The internal combustion engine 12, the motor 14, and the generator 16 are mutually connected via a planetary gear type power dividing mechanism 18. A reducer 20 is connected to a rotating shaft of the motor 14 connected to the power dividing mechanism 18. The reducer 20 connects the rotating shaft of the motor 14 with a drive shaft 24 connected to drive wheels 22. The power dividing mechanism 18 divides a drive force of the internal combustion engine 12 into the generator 16 and the reducer 20. The distribution rate of the drive force by the power dividing mechanism 18 can be freely changed.

The drive system 10 further includes an inverter 26, a converter 28, and a high voltage battery 30. The inverter 26 is connected to the generator 16 and the motor 14, and also connected to the high voltage battery 30 via the converter 28. The electric power generated by the generator 16 may be supplied to the motor 14 via the inverter 26, or charged into the high voltage battery 30 via the inverter 26 and the converter 28. The electric power charged into the high voltage battery 30 can be supplied to the motor 14 via the converter 28 and the inverter 26.

The drive system 10 described above can rotate the drive wheels 22 only by the drive force of the internal combustion engine 12 in a state in which the motor 14 is being stopped, and, conversely, can rotate the drive wheels 22 only by the drive force of the motor 14 in a state in which the internal combustion engine 12 is being stopped, according to predetermined conditions. In addition, the system can also rotate the drive wheels 22 by the drive forces of both the motor 14 and the internal combustion engine 12 while operating both of them. Furthermore, by the generator 16 functioning as a starter to drive the internal combustion engine 12, it is also possible to control start-up of the internal combustion engine 12.

The drive system 10 of the present embodiment is controlled by an electronic control unit (ECU) 40. The ECU 40 comprehensively controls the drive system 10 including the internal combustion engine 12, the motor 14, the generator 16, the power dividing mechanism 18, the inverter 26, the converter 28, and the like.

[System Configuration of Internal Combustion Engine]

Figure 2:
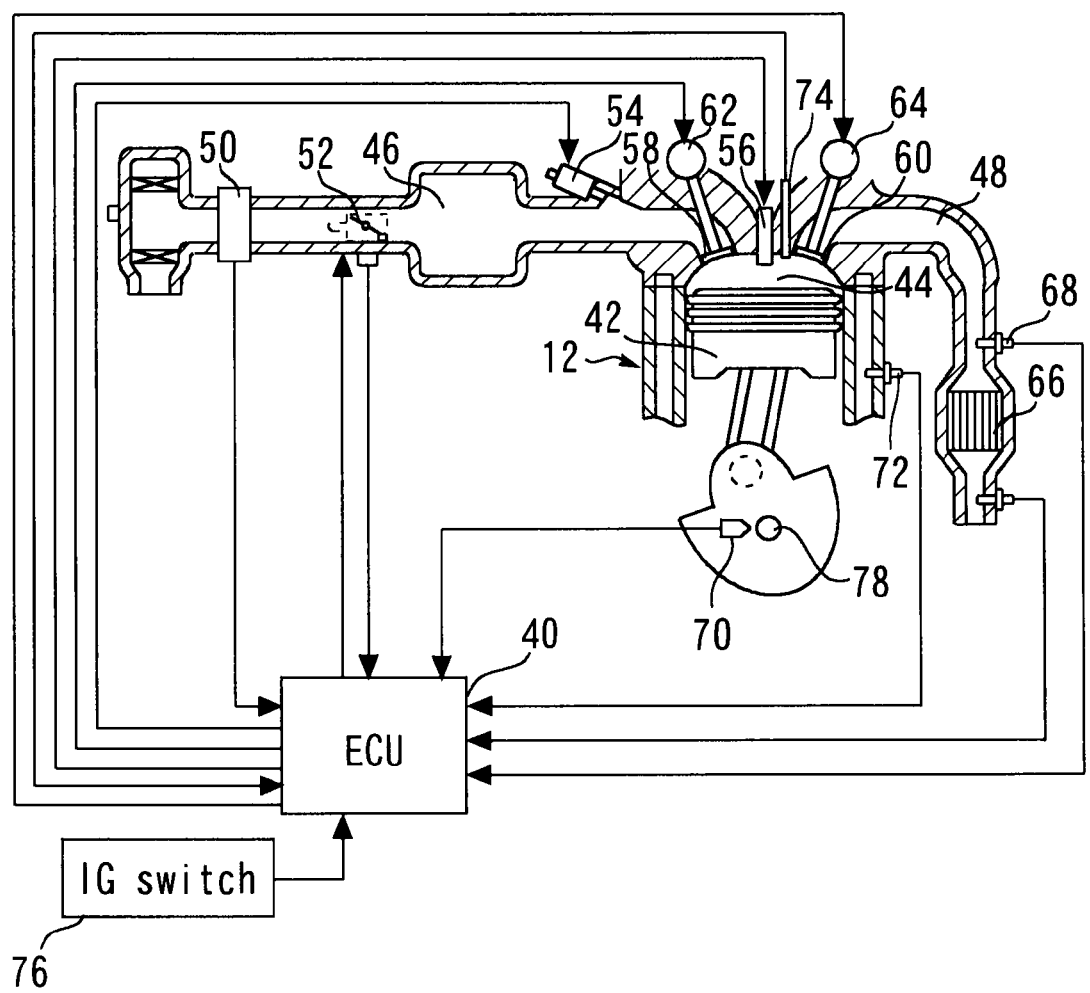
FIG. 2 is a diagram for explaining the system configuration of the internal combustion engine shown in FIG. 1.

FIG. 2 is a diagram for explaining the system configuration of the internal combustion engine 12 shown in FIG. 1. Here, the internal combustion engine 12 is supposed to be a straight 4-cylinder engine which includes four cylinders (No. 1 to No. 4) and in which explosion strokes are performed at uniform intervals in the order (for example) of No. 1 to No. 3, to No. 4, and to No. 2. Each of cylinders of the internal combustion engine 12 contains a piston 42. Each of the cylinders of the internal combustion engine 12 has a combustion chamber 44 formed atop the piston 42. An intake passage 46 and an exhaust passage 48 are communicated with the combustion chamber 44.

An air flow meter 50 is installed near the inlet of the intake passage 46 to output a signal representing the flow rate of the air taken into the intake passage 46. A throttle valve 52 is installed downstream of the air flow meter 50. The throttle valve 52 is an electronically controlled throttle valve that can control an open position of the throttle valve independently of an open position of an accelerator.

A fuel injection valve 54 for injecting a fuel into an intake port of the internal combustion engine 12 is disposed downstream with respect to the throttle valve 52. At a cylinder head of the internal combustion engine 12, an ignition plug 56 is mounted for each cylinder in such a form as to project from an upper section of the combustion chamber 44 into the combustion chamber 44. An intake valve 58 and an exhaust valve 60 are provided at the intake port and an exhaust port, respectively. The intake valve 58 establishes continuity or discontinuity between the combustion chamber 44 and the intake passage 46, and the exhaust valve 60 establishes continuity or discontinuity between the combustion chamber 44 and the exhaust passage 48.

The intake valve 58 and the exhaust valve 60 are driven by an intake variable valve operating apparatus 62 and an exhaust variable valve operating apparatus 64, respectively. The detailed configurations of the variable valve operating apparatuses 62 and 64 will be described later with reference to FIGS. 3 to 13. In addition, in the exhaust passage 48, a catalyst 66 for purifying exhaust gas is disposed. Moreover, in an upper stream of the catalyst 66 in the exhaust passage 48, an A/F sensor 68 for detecting an air fuel ratio of the exhaust gas is installed.

Furthermore, there are connected to the input of the ECU 40 described above, a crank angle sensor 70 for detecting engine speed, a cooling water temperature sensor 72 for detecting a temperature of engine cooling water, a cylinder pressure sensor 74 for detecting a pressure within the combustion chamber 44 (cylinder pressure), and an ignition switch (IG switch) 76 of the vehicle as well as the various types of sensors described above. In addition, there are connected to the output of the ECU 40, the various types of actuators described above. The ECU 40 can control the operating state of the internal combustion engine 12 based on those sensor outputs.

Next, the configuration and operation of the intake variable valve operating apparatus 62 will be described with reference to FIGS. 3 to 13.

[Configuration of Variable Valve Operating Apparatus]

Figure 3:
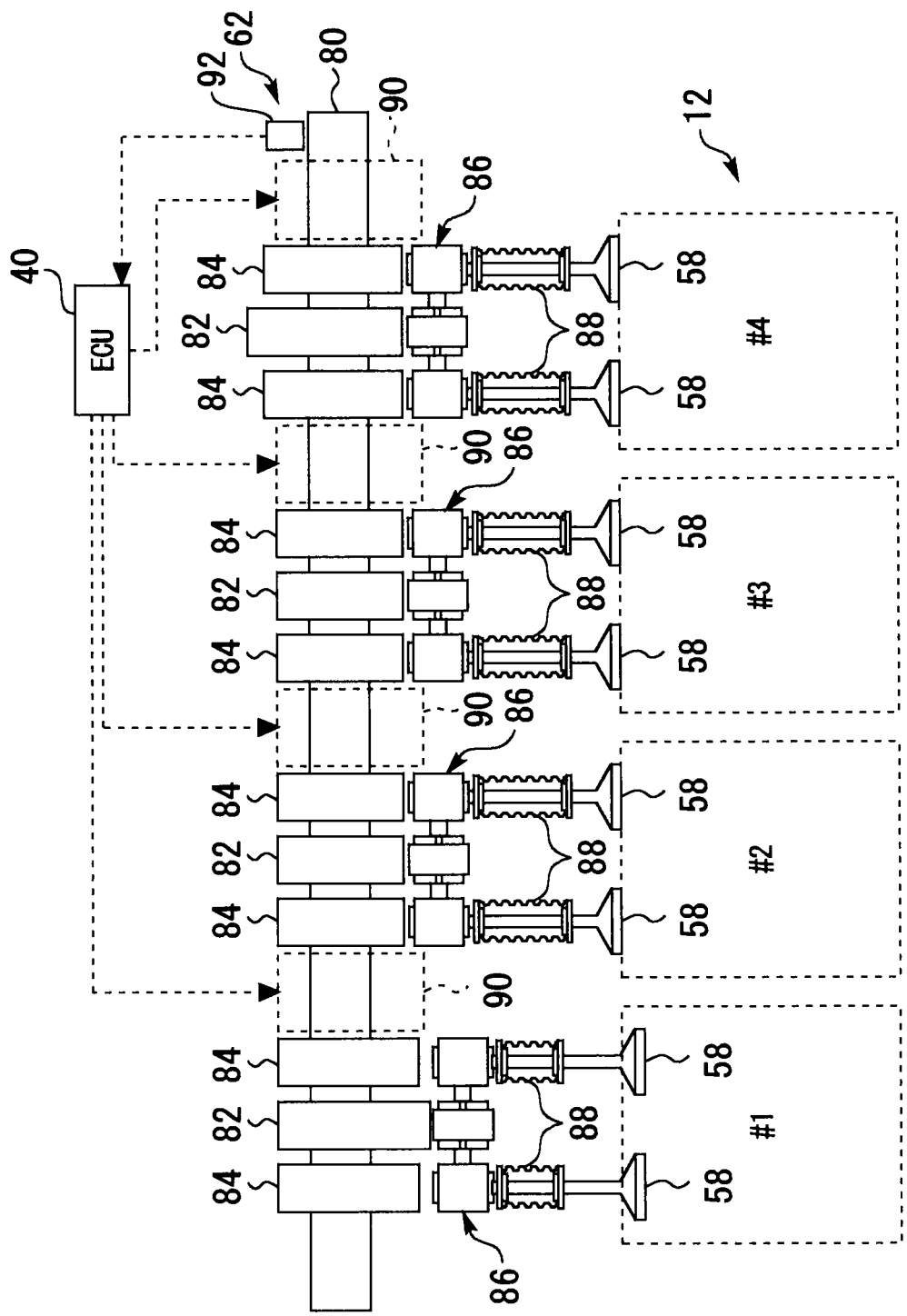
FIG. 3 is a schematic diagram showing the overall configuration of the intake variable valve operating apparatus shown in FIG. 2.

FIG. 3 is a schematic diagram showing the overall configuration of the intake variable valve operating apparatus 62 shown in FIG. 2. Note that description will herein be made on an example of the intake variable valve operating apparatus 62, while it is assumed that the exhaust variable valve operating apparatus 64 is basically configured in the same manner as the intake variable valve operating apparatus 62.

The variable valve operating apparatus 62 of the present embodiment includes a camshaft 80. The camshaft 80 is connected to a crankshaft 78 (See FIG. 2) by means of a timing chain or a timing belt and is configured to rotate at a half speed of that of the crankshaft 78. The camshaft 80 is formed with a main cam 82 and two auxiliary cams 84 for one cylinder. The main cam 82 is disposed between two auxiliary cams 84.

The main cam 82 includes an arc-shaped base circle part 82a (see FIG. 5) concentric with the camshaft 80, and a nose part 82b (see FIG. 5) which is formed such that a part of the base circle expands outwardly in the radial direction. Moreover, in the present embodiment, the auxiliary cam 84 is configured to be a cam which includes only a base circle part (a zero lift cam) (see FIG. 6).

A variable mechanism 86 is interposed between the cam 82, 84 and the intake valve 58 (hereafter, simply abbreviated as the "valve 58") of each cylinder. That is, the acting force of the cam 82 or 84 is arranged to be transferred to the two valves 58 via the variable mechanism 86. The valve 58 is adapted to be opened and closed by use of the acting force of the cam 82 or 84, and the biasing force of valve spring 88. Note that the state shown in FIG. 3 represents a state in which the valve 58 of the cylinder No. 1 is opened by being subjected to the acting force of the main cam 82.

The variable mechanism 86 is a mechanism to change the valve-open characteristics of the valve 58 by switching between the state in which the acting force of the main cam 82 is transferred to the valve 58 and the state in which the acting force of the auxiliary cam 84 is transferred to the valve 58. Note that, in the present embodiment, since the auxiliary cam 84 is a zero-lift cam, the state in which the acting force of the auxiliary cam 84 is transferred to the valve 58 refers to a state in which neither opening nor closing of the valve 58 take place (a valve halted state).

Moreover, the variable valve operating apparatus 62 of the present embodiment includes, for each cylinder, a changeover mechanism 90 for driving each variable mechanism 86 to switch operational states of the valve 58 between a valve operable state and a valve stop state. In addition, there is connected to the ECU 40, a cam angle sensor 92 for detecting a rotational angle of the camshaft 80. The changeover mechanism 90 is adapted to be driven according to a driving signal from the ECU 40 described above.

(Configuration of Variable Mechanism)

Next, a detailed configuration of the variable mechanism 86 will be described with reference to FIGS. 4 to 6.

Figure 4:
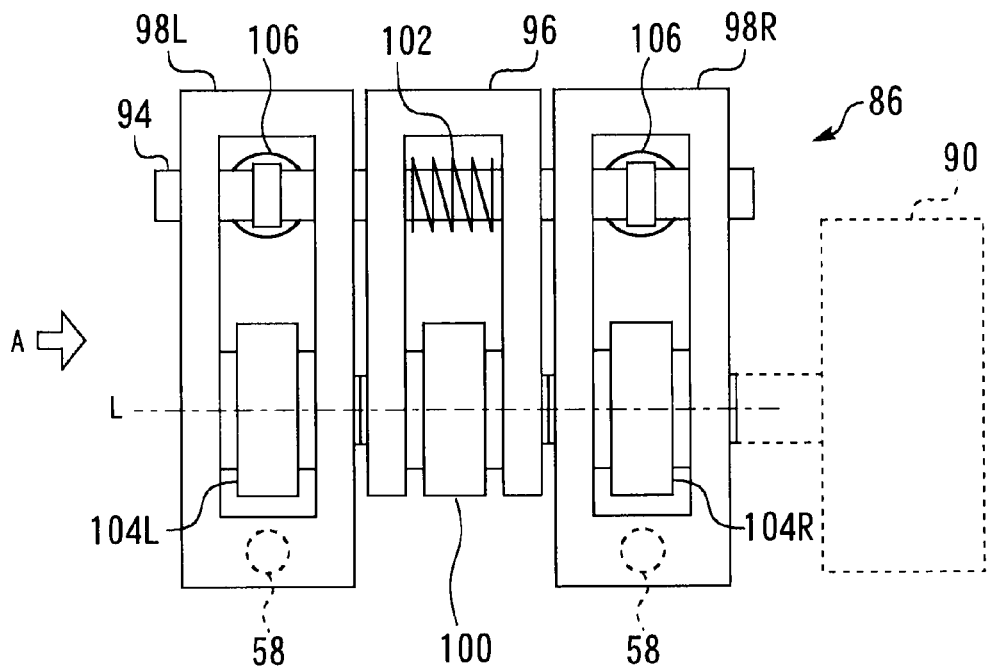
FIG. 4 is a look-down view of the variable mechanism shown in FIG. 3 seen from the proximal end part side of a valve.

FIG. 4 is a look-down view of the variable mechanism 86 shown in FIG. 3 seen from the proximal end part side of the valve 58.

The variable mechanism 86 includes a rocker shaft 94 which is disposed in parallel with the camshaft 80. As shown in FIG. 4, a first rocker arm 96 and a pair of second rocker arms 98R and 98L are rotatably attached to the rocker shaft 94. The first rocker arm 96 is disposed between the two second rocker arms 98R and 98L. Note that, in the present description, the right and left second rocker arms 98R and 98L may be referred to simply as a second rocker arm 98 when they are not particularly discriminated.

Figure 5:
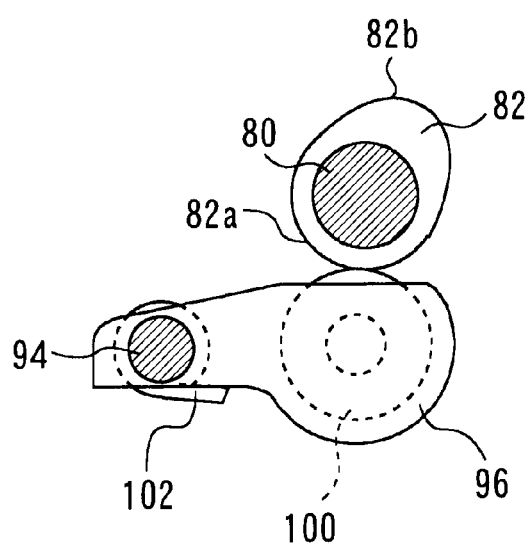
FIG. 5 is a view of a first rocker arm seen from the axial direction (the direction shown by an arrow A in FIG. 4) of a rocker shaft.
Figure 6:
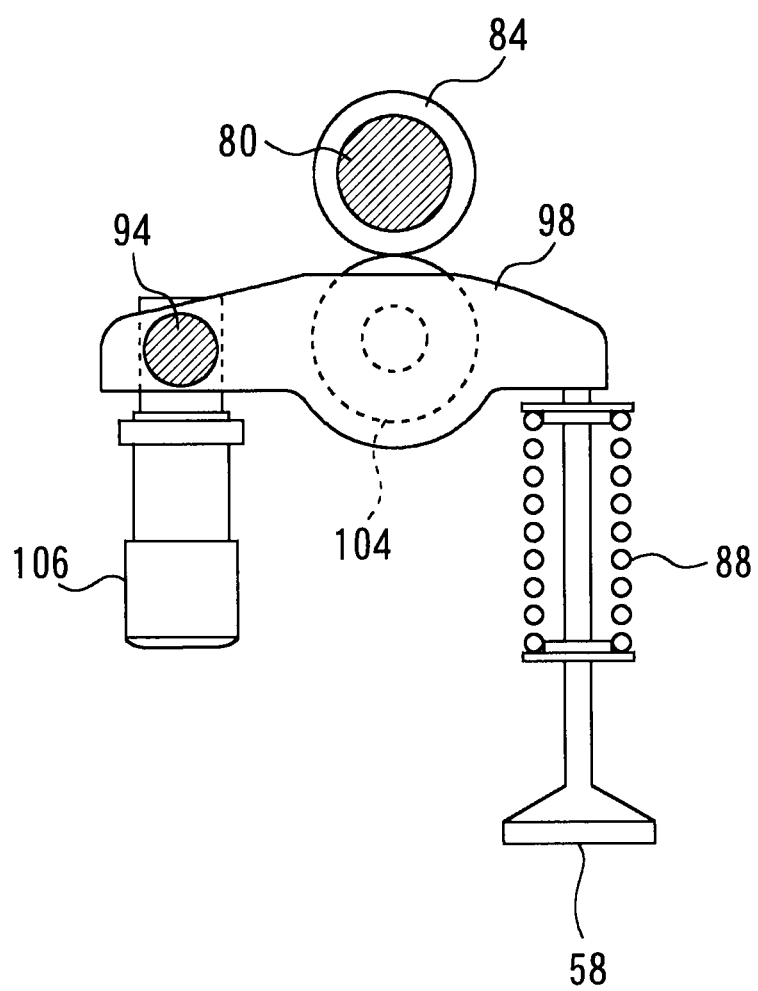
FIG. 6 is a view of a second rocker arm seen from the axial direction (the direction shown by the arrow A) of the rocker shaft in the same manner as in FIG. 5.

FIG. 5 is a view of the first rocker arm 96 seen from the axial direction (the direction shown by an arrow A in FIG. 4) of the rocker shaft 94, and FIG. 6 is a view of the second rocker arm 98 seen from the axial direction (the direction shown by the arrow A) of the rocker shaft 94 in the same manner as in FIG. 5.

As shown in FIG. 5, a first roller 100 is rotatably attached to the end part opposite to the rocker shaft 94 in the first rocker arm 96 at a position which allows a contact with the main cam 82. The first rocker arm 96 is biased by a coil spring 102 attached to the rocker shaft 94 such that the first roller 100 is constantly in abutment with the main cam 82.

On the other hand, as shown in FIG. 6, the proximal end part of the valve 58 (specifically, the proximal end part of the valve stem) is in abutment with the end part opposite to the rocker shaft 94 in the second rocker arm 98. Moreover, a second roller 104 is rotatably attached to a central portion of the second rocker arm 98.

Moreover, it is supposed that the rocker shaft 94 is supported by a cam carrier (or, for example, the cylinder head), which is a stationary member of the internal combustion engine 12, via a rush adjuster 106 at the other end of the second rocker arm 98. Therefore, the second rocker arm 98 is biased toward the auxiliary cam 84 by being subjected to an upward force from the rush adjuster 106.

Further, the position of the second roller 104 with respect to the first roller 100 is defined such that the axial center of the second roller 104 and the axial center of the first roller 100 are positioned on the same straight line L as shown in FIG. 4, when the first roller 100 is in abutment with the base circle part 82a of the main cam 82 (see FIG. 5) and the second roller 104 is in abutment with the base circle part of the auxiliary cam 84 (see FIG. 6).

(Configuration of Changeover Mechanism)

Next, a detailed configuration of the changeover mechanism 90 will be described with reference to FIGS. 7 and 8.

The changeover mechanism 90, which is a mechanism for switching the connection/disconnection concerning the first rocker arm 96 and the second rocker arm 98, makes it possible to switch the operational states of the valve 58 between the valve operable state and the valve stop state (the state in which the valve 58 is halted in a closed state) by switching the state in which the acting force of the main cam 82 is transferred to the second rocker arm 98 and the state in which the forgoing acting force is not transferred to the second rocker arm 98.

Figure 7:
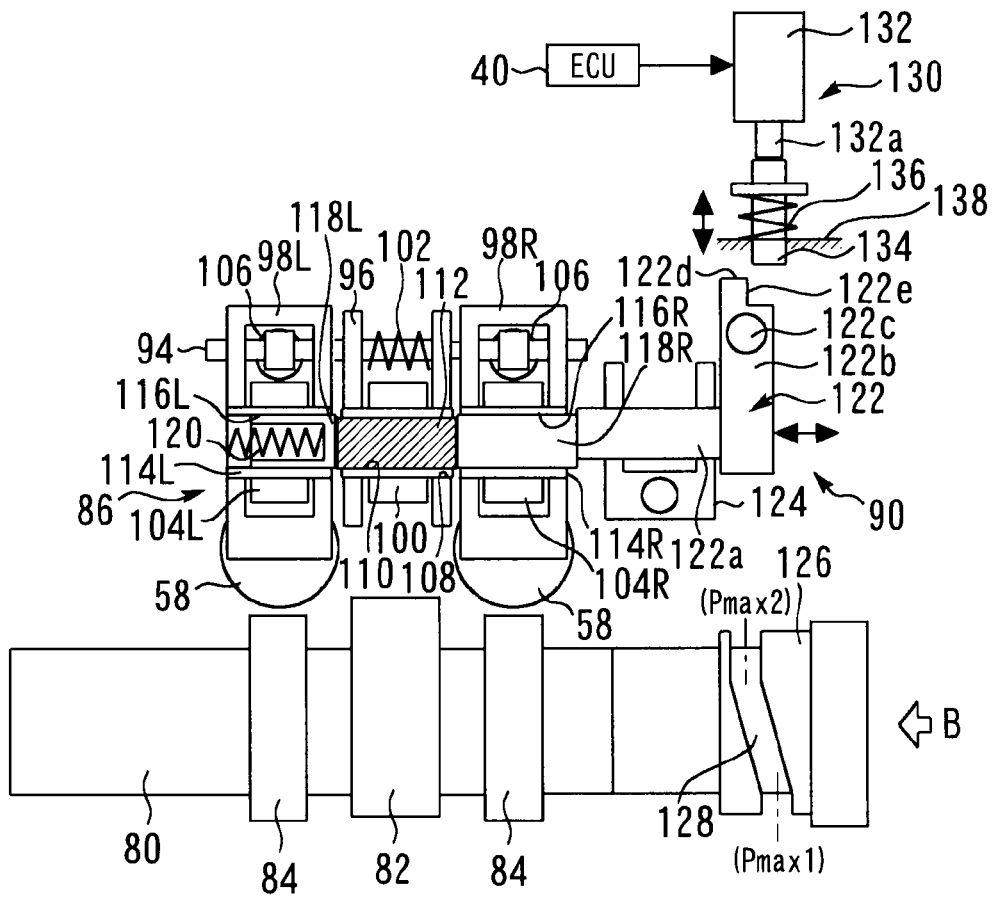
FIG. 7 is a diagram illustrating a detailed configuration of a changeover mechanism shown in FIG. 3.

FIG. 7 is a diagram illustrating a detailed configuration of the changeover mechanism 90 shown in FIG. 3. Note that, in FIG. 7, the variable mechanism 86 is represented by using a section taken at the axial centers of the rollers 100 and 104. Moreover, for the sake of simplicity of description, the mounting position of the camshaft 80 with respect to the mounting position of the variable mechanism 86 is represented in a state different from the actual mounting position excepting the axial position of the camshaft 80.

As shown in FIG. 7, a first pin hole 110 is formed within a first spindle 108 of the first roller 100 so as to pass through in its axial direction, and the both ends of the first pin hole 110 are opened to both side surfaces of the first rocker arm 96. A first changeover pin 112 having a circular column shape is slidably inserted into the first pin hole 110.

On the other hand, there is formed inside a second spindle 114L of the second roller 104 of the second rocker arm 98L side, a second pin hole 116L of which end part opposite to the first rocker arm 96 is closed and of which end part of the first rocker arm 96 side is opened. Moreover, inside a second spindle 114R of the second roller 104 of the second rocker arm 98R side, a second pin hole 116R is formed so as to pass through in its axial direction, and both ends of the second pin hole 116R are opened to the both side surfaces of the second rocker arm 98R.

A second changeover pin 118L of a circular column shape is slidably inserted into the second pin hole 116L. Moreover, inside the second pin hole 116L, there is disposed a return spring 120 which biases the second changeover pin 118L toward the first rocker arm 96 direction (hereafter, referred to as the "advancing direction of changeover pin"). In addition, a second changeover pin 118R of a circular column shape is slidably inserted into the second pin hole 116R.

The relative positions of three pin holes 110, 116L, and 116R described so far are defined such that the axial centers of the three pin holes 110, 116L, and 116R are positioned on the same straight line L, when the first roller 100 is in abutment with the base circle part 82a of the main cam 82 (see FIG. 5) and the second roller 104 is in abutment with the base circle part of the auxiliary cam 84 (see FIG. 6).

Figure 8:
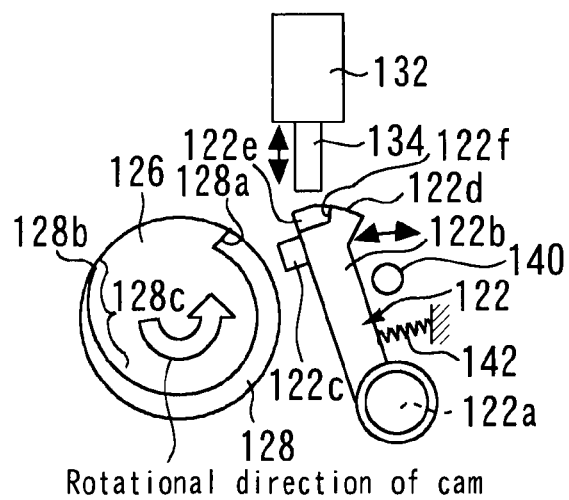
FIG. 8 is a view of the changeover mechanism seen from the axial direction of a camshaft (the direction of an arrow B in FIG. 7)

Here, newly referring to FIG. 8 as well as above-described FIG. 7, description on the changeover mechanism 90 will be continued. FIG. 8 is a view of the changeover mechanism 90 seen from the axial direction of the camshaft 80 (the direction of an arrow B in FIG. 7). Note that in the figures following FIG. 8, the relation between a lock pin 134 and a solenoid 132 may be illustrated in a simplified form.

The changeover mechanism 90 includes a slide pin 122 for forcing the changeover pins 112, 118L, and 118R to be displaced toward the second rocker arm 98L side (in the retreating direction of the changeover pin) with the aid of the rotative power of the main cam 82. The slide pin 122 includes, as shown in FIG. 7, a circular column part 122a having a end face which is in abutment with the end face of the second changeover pin 118R. The circular column part 122a is supported by a support member 124 fixed to the cam carrier so as to be advanceable/retreatable in the axial direction and rotatable in the circumferential direction.

Moreover, a bar-like arm part 122b is provided so as to protrude outwardly in the radial direction of the circular column part 122a at the end part opposite to the second changeover pin 118R in the circular column part 122a. That is, the arm part 122b is configured to be rotatable around the axial center of the circular column part 122a. The distal end part of the arm part 122b is configured, as shown in FIG. 8, to extend up to a position opposed to the peripheral surface of the camshaft 80. Moreover, a projection part 122c is provided at the distal end part of the arm part 122b so as to protrude toward the peripheral surface of the camshaft 80.

There is formed in the outer peripheral surface opposed to the projection part 122c in the camshaft 80, a large-diameter part 126 having a larger diameter than that of the camshaft 80. There is formed in the peripheral surface of the large-diameter part 126, a helical guide rail 128 extending in the circumferential direction. The width of the guide rail 128 is formed to be slightly larger than the outer diameter of the projection part 122c.

Moreover, the changeover mechanism 90 includes an actuator 130 for inserting the projection part 122c into the guide rail 128. To be more specific, the actuator 130 includes a solenoid 132 which is duty controlled based on the command from the ECU 40 and a lock pin 134 which is in abutment with the drive axis 132a of the solenoid 132. The lock pin 134 is formed into a cylindrical shape.

One end of the spring 136, which exerts a biasing force against the thrust of the solenoid 132, is fixedly engaged to the lock pin 134 and the other end of the spring 136 is fixedly engaged to a support member 138 fixed to the cam carrier which is a stationary member. According to such configuration, when the solenoid 132 is driven based on the command from the ECU 40, the lock pin 134 can be advanced as a result of the thrust of the solenoid 132 overpowering the biasing force of the spring 136 and, on the other hand, when the driving of the solenoid 132 is stopped, the lock pin 134 and the driving shaft 132a can be quickly retreated to a predetermined position by the biasing force of the spring 136. Moreover, the lock pin 134 is restricted from moving in its radial direction by the support member 138.

Moreover, it is supposed that the solenoid 132 is fixed to a stationary member such as a cam carrier, at a position where the lock pin 134 can press the pressing surface (the surface opposite to the surface where the projection part 122c is provided) 122d of the distal end part of the arm part 122b of the slide pin 122 against the guide rail 128. In other words, the pressing surface 122d is provided in a shape and at a position where the projection part 122c can be pressed toward the guide rail 128 by the lock pin 134.

The arm part 122b of the slide pin 122 is arranged to be rotatable around the axial center of the circular column part 122a within a range restricted by the large-diameter part 126 of the camshaft 80 side and a stopper 140. Then, the positional relationship of each component is arranged such that when the arm part 122b is within the abovementioned range, and when the axial position of the slide pin 122 is at a displacement end Pmax1 described later, the lock pin 134 driven by the solenoid 132 can come into abutment with the pressing surface 122d of the arm part 122b securely. Moreover, attached to the arm part 122b is a spring 142 which biases the arm part 122b toward the stopper 140.

The helical direction in the guide rail 128 of the camshaft 80 is arranged such that when the camshaft 80 is rotated in a predetermined rotational direction shown in FIG. 8 with the projection part 122c being inserted thereinto, the slide pin 122 causes the changeover pins 112, 118L, and 118R to be displaced in the direction approaching the rocker arms 96 and 98 while pushing aside them in the retreating direction against the biasing force of the return spring 120.

Here, the position of the slide pin 122, in a state where the second changeover pin 118L is inserted into both the second pin hole 116L and the first pin hole 110 and where the first changeover pin 112 is inserted into both the first pin hole 110 and the second pin hole 116R by the biasing force of the return spring 120, is referred to as a "displacement end Pmax1". When the slide pin 122 is positioned at this displacement end Pmax1, the first rocker arm 96 and the second rocker arms 98R and 98L all become connected with each other. Moreover, the position of the slide pin 122 in a state where as a result of the changeover pin 112 and the like being subjected to a force from the slide pin 122, the second changeover pin 118L, the first changeover pin 112, and the second changeover pin 118R are respectively inserted only into the second pin hole 116L, the first pin hole 110, and the second pin hole 116R, is referred to as a "displacement end Pmax 2". That is, when the slide pin 122 is positioned at this displacement end Pmax2, the first rocker arm 96, and the second rocker arms 98R and 98L are all disconnected from each other.

In the present embodiment, the position of the proximal end 128a of the guide rail 128 in the axial direction of the camshaft 80 is arranged so as to coincide with the position of the projection part 122c when the slide pin 122 is positioned at the above-described displacement end Pmax1. Further, the position of the terminal end 128b of the guide rail 128 in the axial direction of the camshaft 80 is arranged so as to coincide with the position of the projection part 122c when the slide pin 122 is positioned at the above-described displacement end Pmax2. That is, in the present embodiment, the configuration is made such that the slide pin 122 is displacable between the displacement end Pmax1 and the displacement end Pmax2 within the range in which the projection part 122c is guided by the guide rail 128.

Further, as shown in FIG. 8, the guide rail 128 of the present embodiment is provided with a shallow bottom part 128c, in which the depth of the guide rail 128 gradually decreases as the camshaft 80 rotates, as a predetermined section of the terminal end 128b side after the slide pin 122 reaches the displacement end Pmax2. Note that the depth of the portion other than the shallow bottom part 128c in the guide rail 128 is constant.

Moreover, the arm part 122b in the present embodiment is provided with a notch part 122e which is formed into a concave shape by notching a part of a pressing surface 122d. The pressing surface 122d is provided so as to be kept in abutment with the lock pin 134 while the slide pin 122 is displaced from the displacement end Pmax1 to the displacement end Pmax2. Further, the notch part 122e is provided in a portion where it can be engaged with the lock pin 134 when the projection part 122c is taken out on the surface of the large-diameter part 126 by the action of the above-described shallow bottom part 128c, in a state where the slide pin 122 is positioned at the above-described displacement end Pmax2.

Moreover, the notch part 122e is formed so as to be engaged with the lock pin 134 in a mode in which the rotation of the arm part 122b in the direction in which the projection part 122c is inserted into the guide rail 128 can be restricted, and the movement of the slide pin 122 in the advancing direction of the changeover pin can be restricted. To be more specific, there is provided in the notch part 122e, a guide surface 122f which guides the slide pin 122 so as to move away from the large-diameter part 126 as the lock pin 134 moves into the notch part 122e.

[Operation of Variable Valve Operating Apparatus]

Next, the operation of the intake variable valve operating apparatus 62 will be described with reference to FIGS. 9 to 13.

(During Valve Operable State)

Figure 9:
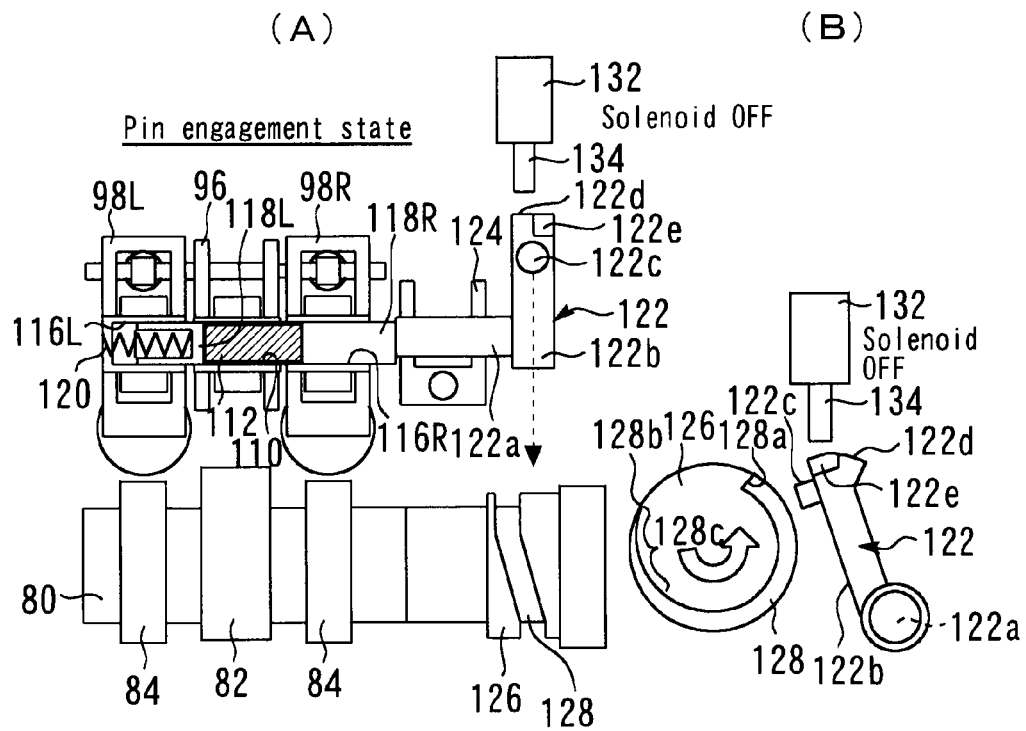
FIG. 9 is a diagram showing a control state during a valve operable state (normal lift operation)

FIG. 9 is a diagram showing a control state during a valve operable state (normal lift operation).

In this case, as shown in FIG. 9(B), the driving of the solenoid 132 is turned off, and thus the slide pin 122 is positioned at the displacement end Pmax1 in a state of being separated from the camshaft 80 and subjected to the biasing force of the return spring 120. In this state, as shown in FIG. 9(A), the first rocker arm 96 and the two second rocker arms 98 are connected via the changeover pins 112 and 118L. As a result of that, the acting force of the main cam 82 is transferred from the first rocker arm 96 to both the valves 58 via the left and right second rocker arms 98R and 98L. Thus, the normal lift operation of the valve 58 is performed according to the profile of the main cam 82.

(At the Start of Valve Stop Operation (the Start of Slide Operation))

Figure 10:
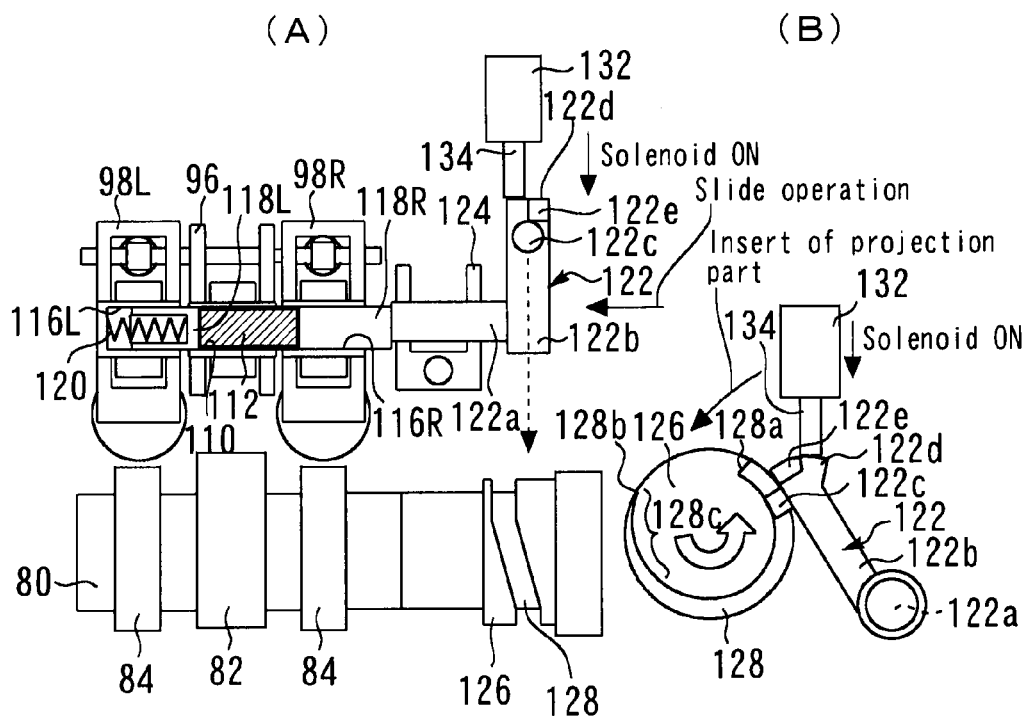
FIG. 10 is a diagram showing a control state at the start of a valve stop operation.

FIG. 10 is a diagram showing a control state at the start of a valve stop operation.

The valve stop operation is performed when, for example, an execution request of a predetermined valve stop operation such as a fuel cut request of the internal combustion engine 12 is detected by the ECU 40. Since such valve stop operation is an operation to displace the changeover pins 112, 118L, and 118R in their retreating direction by means of the slide pin 122 with the aid of the rotative power of the main cam 82, such operation needs to be performed while the axial centers of these changeover pins 112, 118L, and 118R are positioned on the same straight line, that is, while the first rocker arm 96 is not oscillating.

In the present embodiment, the guide rail 128 is arranged such that the section within which the slide pin 122 performs a slide operation in the retreating direction of changeover pins corresponds to the base circle section of the main cam 82. As a result of this, when the ECU 40 detects an execution request for a predetermined valve stop operation, with the solenoid 132 being driven in the order starting from a cylinder at which the base circle section first arrives, as shown in FIG. 10(B), the projection part 122c is inserted into the guide rail 128, thereby successively starting the valve stop operation of each cylinder. Then, as the projection part 122c which has been inserted into the guide rail 128 being guided by the guide rail 128, a slide operation of the slide pin 122 is started toward the displacement end Pmax2 side, as shown in FIG. 10(A), with the aid of the rotative power of the camshaft 80.

(At the Completion of Slide Operation)

Figure 11:
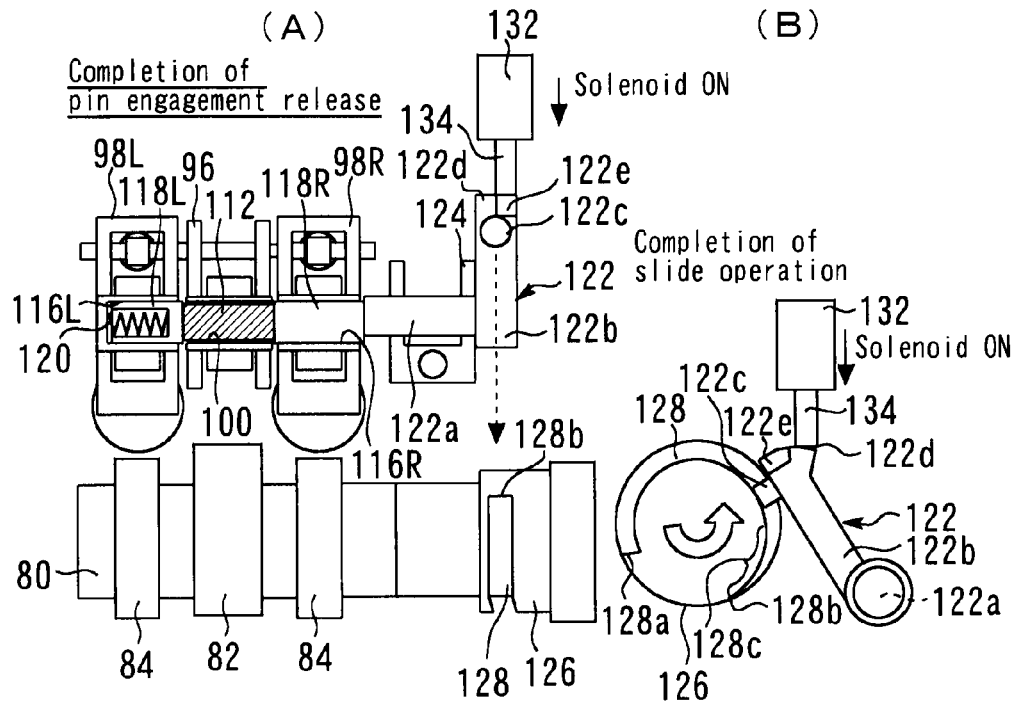
FIG. 11 is a diagram showing a control state at the completion of the slide operation.

FIG. 11 is a diagram showing a control state at the completion of the slide operation.

During the execution of the slide operation, the slide pin 122 moves toward the displacement end Pmax2, in a state in which the biasing force of the return spring 120 is received by the projection part 122c being in abutment with the side surface of the guide rail 128. FIG. 11(A) shows a timing at which the slide pin 122 has reached the displacement end Pmax2 and the slide operation at the time of a valve stop request is completed, that is, a timing at which the connection between the first rocker arm 96 and the second rocker arms 98R and 98L is released as a result of the first changeover pin 112 and the second changeover pin 118L becoming accommodated into the first pin hole 110 and the second pin hole 116L, respectively. Moreover, at this timing, as shown in FIG. 11(B), the position of the projection part 122c within the guide rail 128 has not yet reached the shallow bottom part 128c.

When the slide operation is completed as shown above, and the first rocker arm 96 and the second rocker arms 98R and 98L become a disconnection state, the first rocker arm 96, which is biased by the coil spring 102 toward the main cam 82 as the main cam 82 rotates, comes to oscillate by itself. As a result of this, the acting force of the main cam 82 is not transferred to the two second rocker arms 98. Further, since the auxiliary cam 84, against which the second rocker arm 98 abuts, is a zero lift cam, the force for driving the valve 58 is no more provided to the second rocker arms 98, to which the acting force of the main cam 82 has come not to be transferred. As a result of that, since, regardless of the rotation of the main cam 82, the second rocker arm 98 comes into a stationary state, the lift operation of the valve 58 becomes stopped.

(At the Time of Holding Operation of Displacement Member)

Figure 12:
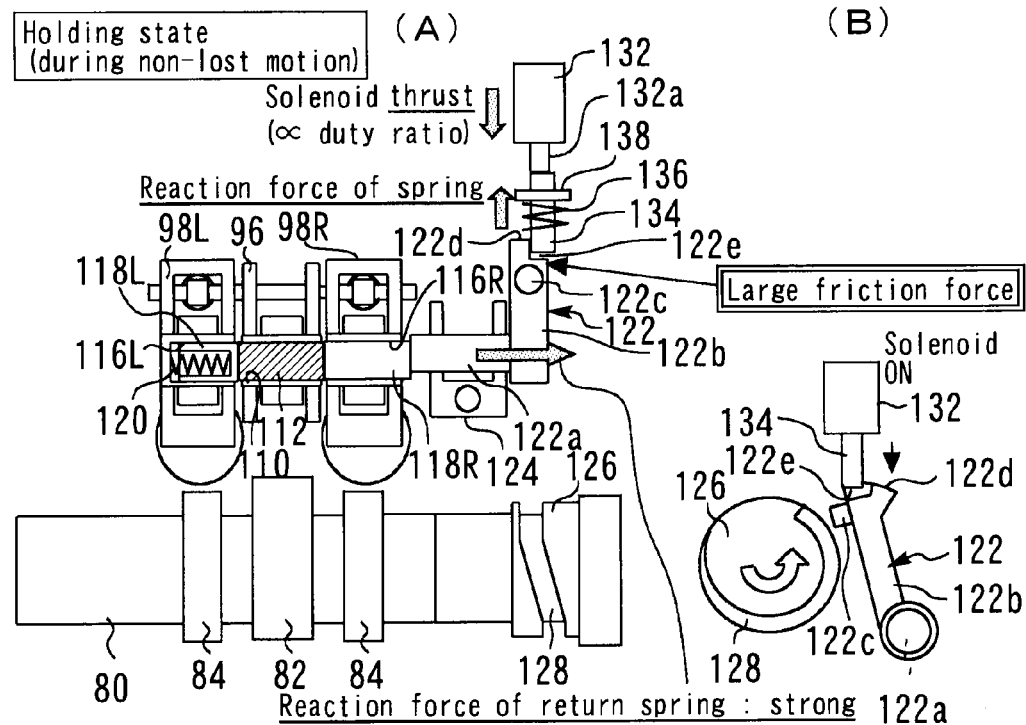
FIG. 12 is a diagram showing a control state at the time of a holding operation to hold a slide pin with a lock pin.
Figure 13:
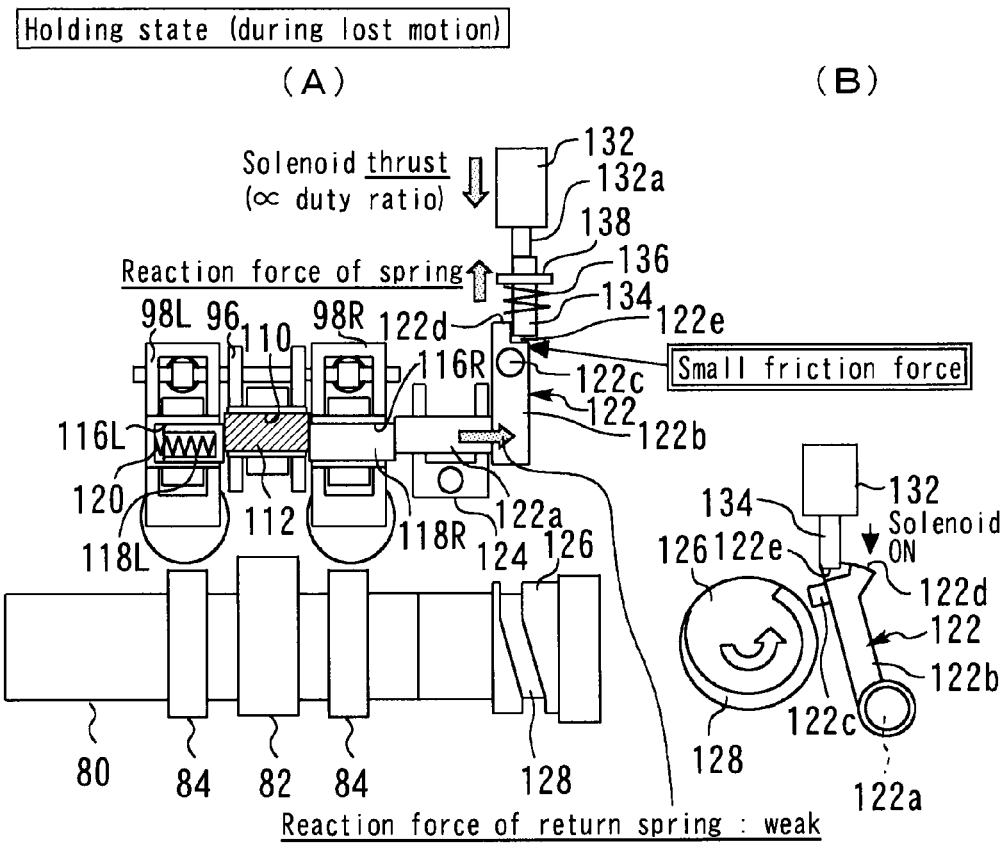
FIG. 13 is a diagram showing the control state at the time of the holding operation to hold the slide pin with the lock pin.

FIGS. 12 and 13 are diagrams showing a control state at the time of a holding operation to hold the slide pin 122 with the lock pin 134. To be more specific, FIG. 12 shows a state in which the first rocker arm 96 is not performing an oscillating operation (lift operation), while FIG. 13 shows a state in which the first rocker arm 96 is performing the oscillating operation (lift operation).

When the camshaft 80 further rotates after the slide operation shown in above-described FIG. 11 is completed, the projection part 122c comes close to the shallow bottom part 128c in which the depth of the groove gradually decreases. As a result of that, the action of the shallow bottom part 128c causes the slide pin 122 to rotate in the direction separated from the camshaft 80. Then, as the depth of the groove decrease due to the shallow bottom part 128c, the lock pin 134 is displaced a little in its retreating direction. Thereafter, when the slide pin 122 further rotates until the lock pin 134 which is constantly driven by the solenoid 132, coincides with the notch part 122e, the portion of the slide pin 122 side, which is to be abutment with the lock pin 134, is switched from the pressing surface 122d to the notch part 122e.

As a result of that, the lock pin 134 comes to be engaged with the notch part 122e. As a result of this, as shown in FIGS. 12(B) and 13(B), the slide pin 122 comes to be held with the projection part 122c being separated from the camshaft 80, and with the biasing force of the return spring 120 being received by the lock pin 134. For this reason, in this holding operation, as shown in FIGS. 12(A) and 13(A), the state in which the first rocker arm 96 and the second rocker arm 98 are disconnected, that is, the valve stop state is maintained.

(At the Time of Valve Return Operation)

A valve return operation for returning the operation from the valve stop state to the valve operable state in which the normal lift operation is performed is executed, for example, when an execution request of a predetermined valve return operation such as a request for returning from a fuel cut is detected by the ECU 40. Such valve return operation is started by the ECU 40 turning off the energization of the solenoid 132 at a predetermined timing (a timing that is earlier than the start timing of the base circle section in which the changeover pin 112 and the like are movable, by a predetermined time period needed for the operation of the solenoid 132), in a control state shown in FIGS. 12 and 13. When the energization of the solenoid 132 is turned off, the engagement between the notch part 122e of the slide pin 122 and the lock pin 134 is released. As a result of that, the force to hold the first changeover pin 112 and the second changeover pins 118L respectively in the first pin hole 110 and the second pin hole 116L against the biasing force of the return spring 120 disappears.

Because of this, when the base circle section in which the positions of changeover pins 112, 118L, and 118R coincide arrives, the changeover pins 112 and 118L moves in the advancing direction by the biasing force of the return spring 120, thereby returning into a state in which the first rocker arm 96 and the two second rocker arms 98 are connected via the changeover pins 112 and 118L, that is, a state in which a lift operation of the valve 58 is enabled by the acting force of the main cam 82. Moreover, as the changeover pins 112 and 118L moves in the advancing direction by the biasing force of the return spring 120, the slide pin 122 is returned from the displacement end Pmax2 to the displacement end Pmax1 via the second changeover pin 118R.

SUMMARY

According to the intake variable valve operating apparatus 62 of the present embodiment thus configured, it becomes possible to switch the operational states of the valve 58 between the valve operable state and the valve stop state by moving the axial position of the slide pin 122 between the displacement end Pmax1 and the displacement end Pmax2, with the aid of the ON and OFF of the energization of the solenoid 132, the rotational force of the camshaft 80, and the biasing force of the return spring 120.

To be more specific, when the valve stop request is made, by turning on the energization of the solenoid 132 thereby inserting the projection part 122c into the guide rail 128, it is made possible to move the changeover pin 112 and the like in the retreating direction of changeover pin with the slide pin 122 which utilizes the rotational force of the camshaft 80. As a result of that, since the operation of the rocker arms 96 and 98 are mechanically and artfully synchronized with the operation of the changeover pin 118 and the like, it becomes possible to quickly switch the first rocker arm 96 and the two second rocker arms 98 from a connected state to a disconnected state within one base circle section. This makes it possible to obtain the valve stop state. Moreover, when a valve return request is made, by turning off the energization of the solenoid 132 thereby releasing the engagement between the slide pin 122 and the lock pin 134, it is made possible to move the changeover pin 112 and the like and the slide pin 122 in the advancing direction of changeover pin, with the aid of the biasing force of the return spring 120. As a result of that, it becomes possible to quickly switch the first rocker arm 96 and the two second rocker arms 98 from the disconnected state to the connected state within one base circle section, and also to return the slide pin 122 to an original position (Pmax1) at which the valve stop operation can be started. This makes it possible to resume the operational state of the valve 58 to the valve operable state.

[Characteristic Control in the First Embodiment]
(Control During the Automatic Stop of the Internal Combustion Engine)

In the hybrid system having the above described drive system 10, the operation of the internal combustion engine 12 may be automatically stopped as needed, even during power-up of the vehicle system (in a state in which the IG switch 76 of the vehicle is being turned on). Throughout the present description hereunder, a stop of the internal combustion engine 12 in such case may be referred to as the "automatic stop" in order to discriminate from a stop in response to turning off the IG switch 76.

The internal combustion engine 12 stops operating in response to the stop of fuel supply. However, even if the fuel supply to the internal combustion engine 12 is stopped in a situation in which a power for rotating the crankshaft 78 is not supplied from outside (drive wheels 22 or generator 16), the operation of the internal combustion engine 12 (the rotation of the crankshaft 78) is not stopped immediately due to the presence of inertial forces of moving parts (crankshaft 78, piston 42, flywheel and the like) and the crankshaft 78 rotates for a while. Because of this, if the intake and exhaust valves 58 and 60 are operated as usual at that time, fresh air whose oxygen concentration is high is supplied toward the catalyst 66. As a result of that, there is a concern that the degradation of the catalyst 66 arises if the catalyst 66 is in a high-temperature state.

In order to prevent fresh air from being supplied to the catalyst 66 in the process of stopping the internal combustion engine 12, at the time of stopping the internal combustion engine 12, one possible idea would be to energize the solenoid 132 installed on the intake and exhaust side individually in each cylinder so that the intake and exhaust valves 58 and 60 are maintained in the closed state. In the case of the variable valve operating apparatuses 62 and 64 of the present embodiment, however, keeping the energization of the solenoid 132 is needed to maintain the intake and exhaust valves 58 and 60 in the closed state. For this reason, an increase in operating time of the vehicle system in a stopped state of the internal combustion engine 12 (running time by use of the motor 14 or pause time of the vehicle) results in an increase in the energization time of the solenoid 132. As a result of that, there is a concern that fuel economy of the internal combustion engine 12 deteriorates.

Accordingly, in the present embodiment, if fuel supply to the internal combustion engine 12 during power-up of the vehicle system is stopped in a situation in which a temperature of the catalyst 66 is equal to or higher than a degradation possibility temperature of the catalyst 66, in order to reduce electric power consumption while preventing the catalyst 66 from deteriorating at the time of the automatic stop of the internal combustion engine 12, the energization of the solenoid 132 in each cylinder is continuously performed so that the intake and exhaust valves 58 and 60 in each cylinder are stopped in the closed state. Moreover, an arrangement is made such that the energization of the solenoid 132 is stopped in a case in which the crankshaft 78 of the internal combustion engine 12 stops rotating during the energization time period of the solenoid 132 and in which the crankshaft 78 is not driven by an external power (driving force of the generator 16 or rotary reaction force from the drive wheels 22).

Figure 14:
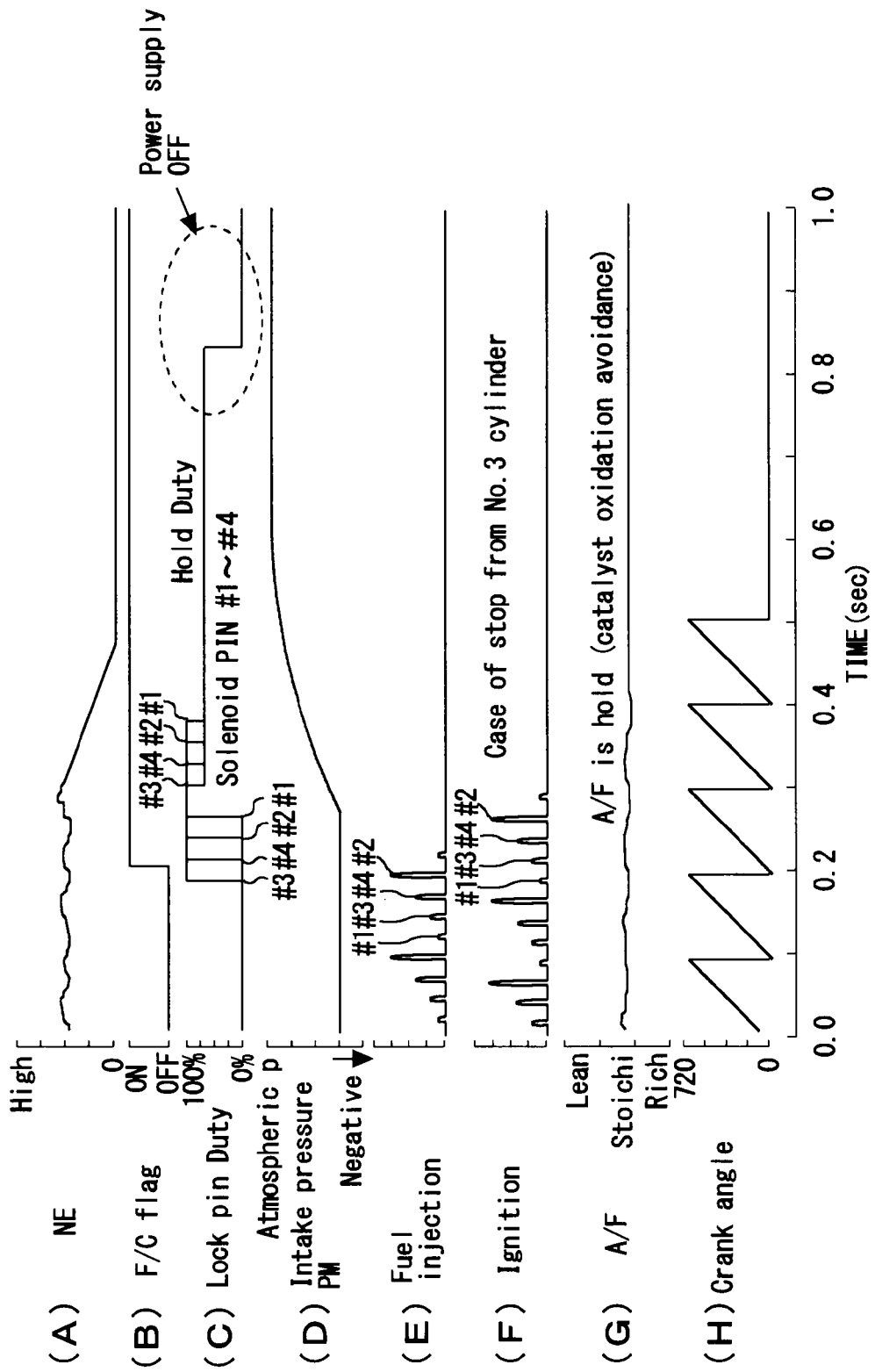
FIG. 14 is a timing chart to illustrate the operation at the time of an automatic stop of the internal combustion engine according to the first embodiment of the present invention.

FIG. 14 is a timing chart to illustrate the operation at the time of the automatic stop of the internal combustion engine 12 according to the first embodiment of the present invention. To be more specific, FIG. 14(A) represents the waveform of an engine speed NE at the time of the automatic stop, and FIG. 14(B) represents the waveform that indicates whether or not a fuel cut F/C flag is ON. In addition, FIG. 14(C) represents the variation of the driving duty ratio of the solenoid 132 driving the lock pin 134, and FIG. 14(D) represents the waveform of an intake pressure PM. Further, FIGS. 14(E) and (F) represent the execution timings of fuel injection and ignition in each cylinder, respectively. Furthermore, FIG. 14(G) represents the waveform of an air fuel ratio of the exhaust gas detected by the A/F sensor 68, and FIG. 14(H) represents the waveform that indicates the variation of a crank angle.

The timing chart shown in FIG. 14 represents an example in which the operation of the internal combustion engine 12 is stopped in the order starting from No. 3 cylinder. In this case, as shown in FIG. 14(C), the energization of the solenoid 132 is started in the order starting from No. 3 cylinder, so that the operations of the intake and exhaust valves 58 and 60 are stopped in the order starting from No. 3 cylinder. In addition, as shown in FIG. 14(B), an execution flag of the fuel cut F/C is set to ON with the start of the energization of the solenoid 132. As a result of that, in synchronicity with the valve stop, the fuel injection in each cylinder is stopped as shown in FIG. 14(E), and the ignition in each cylinder is also stopped.

As the fuel injection is stopped as described above, the engine speed NE is decreased to eventually become zero as shown in FIG. 14(A). In addition, when the valve stop in each cylinder is completed, the duty ratio of the solenoid 132 is decreased to a value required for maintaining the intake and exhaust valves 58 and 60 in the closed state (a hold duty ratio) as shown in FIG. 14(C). Further, since after the valve stop in each cylinder is performed, air comes not to flow from the intake side to the exhaust side, the intake pressure PM becomes enhanced toward atmospheric air pressure.

In the present embodiment, as shown in FIGS. 14(A) and 14(C), an arrangement is made such that after the engine speed NE becomes zero at the time of the automatic stop (that is, after the crankshaft 78 stops rotating during the energization time period of the solenoid 132), the energization of the solenoid 132 is stopped by setting the duty ratio of the solenoid 132 to 0%.

According to the control described so far, maintaining the intake and exhaust valves 58 and 60 in the closed state in the process of stopping the internal combustion engine 12 makes it possible to prevent fresh air from being supplied to the catalyst 66. As a result of this, since the air fuel ratio A/F of the exhaust gas supplied to the catalyst 66 is held at a value near the theoretical (stoichiometric) air fuel ratio as shown in FIG. 14(G), it becomes possible to avoid the catalyst 66 from being oxidized and deteriorating.

Furthermore, the control example shown in FIG. 14 corresponds to a case in which the crankshaft 78 is not driven by the external power. In this case, if the energization of the solenoid 132 is set to OFF after the confirmation of the fact that the engine speed NE has become zero, air does not flow toward the catalyst 66 because the crankshaft 78 stops rotating, and thereby the catalyst 66 is never oxidized as shown in FIG. 14(G). This makes it possible to favorably reduce the electric power consumption while preventing the catalyst 66 from deteriorating even if the catalyst 66 is in a high-temperature state. Therefore, it becomes possible to improve fuel economy of the internal combustion engine 12.

(Control at the Restart of the Internal Combustion Engine)

As described so far, if the energization of the solenoid 132 is turned off after the engine speed NE becomes zero at the time of the automatic stop of the internal combustion engine 12, the engagement between the notch part 122e of the slide pin 122 and the lock pin 134 is released. As a result of this, the valves 58 and 60 in a situation where the main cam 82 does not press first rocker arm 96 (a situation where the base circle part 82a of the main cam 82 is in contact with the first roller 100) come to be returned to the valve operable state by the biasing force of the return spring 120. Moreover, the valves 58 and 60 in a situation where the main cam 82 presses first rocker arm 96 (a situation where the nose part 82b of the main cam 82 is in contact with the first rocker arm 96) come to be returned to the valve operable state after the situation where the main cam 82 does not press the first rocker arm 96 is established in response to the rotation of the camshaft 78 at the time of the restart.

In a state of being returned to the valve operable state as described above, since if the internal combustion engine 12 is started (cranked) after that without any arrangement, the opening and closing operations of the valves 58 and 60 are performed, fresh air whose oxygen concentration is high is supplied toward the catalyst 66. As a result of that, there is a concern that the degradation of the catalyst 66 arises if the temperature of the catalyst 66 is high.

Furthermore, even if the energization of the solenoid 132 is started in response to the restart of the internal combustion engine 12 in order to inhibit the catalyst 66 from deteriorating at the time of the restart (cranking) in the state of being returned to the valve operable state as described above, it takes a predetermined time in switching the operational states of the valves 58 and 60. To be more specific, in the case of the configuration of the variable valve operating apparatuses 62 and 64 according to the present embodiment, as already described, the slide pin 122 guided by the guide rail 128 is displaced in the retreating direction of changeover pin in association with the rotation of the camshaft 80 after the projection part 122c is inserted into the guide rail 128 by starting the energization of the solenoid 132, and then the valve stop state is established. Because of this, a period during which one cycle of the internal combustion engine 12 elapses is required for switching from the valve operable state to the valve stop state. In addition, it is feared that the catalyst deteriorates since fresh air is supplied toward the catalyst 66 during such switching from the valve operable state to the valve stop state.

On the other hand, in order to solve the above-described problem at the time of the restart, if the energization of the solenoid 132 is maintained during the automatic stop contrary to the above-described control at the time of the automatic stop, it becomes not able to reduce the electric power consumption during the automatic stop even if the problem at the restart can be solved. Accordingly, in the present embodiment, a control to turn off the energization of the solenoid 132 as described above is performed during the automatic stop, and at the restart after that, the start-up (combustion) is started from a cylinder at which an intake stroke first arrives at the restart.

Hereinafter, an example that applies the above-described control at the restart of the internal combustion engine 12 is described in detail with reference to FIGS. 15 and 16.

Figure 15:
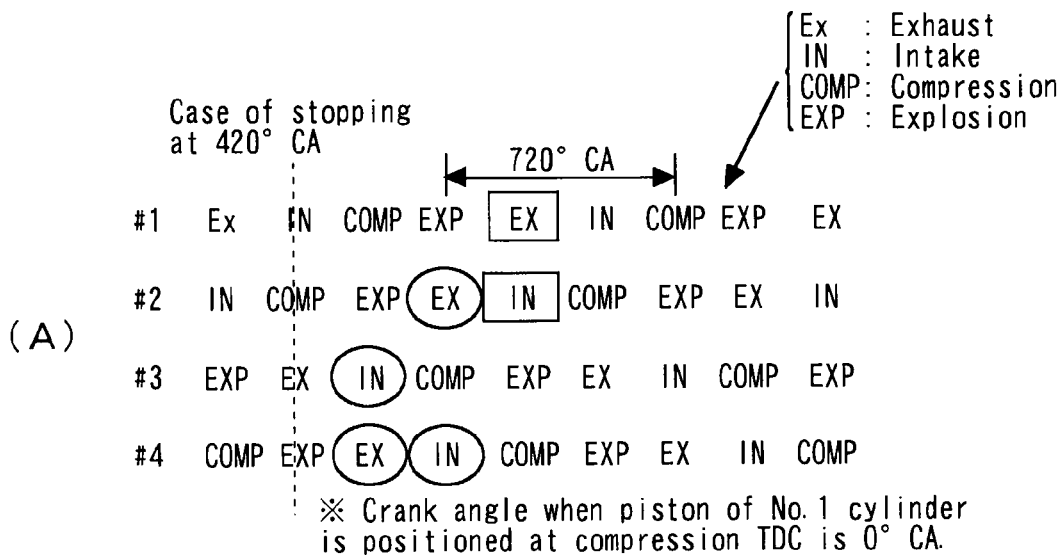
FIG. 15 is a diagram showing an operating condition of each cylinder in a case in which a crankshaft stops rotating at a situation where the crank angle is 420° CA.
Figure 16:
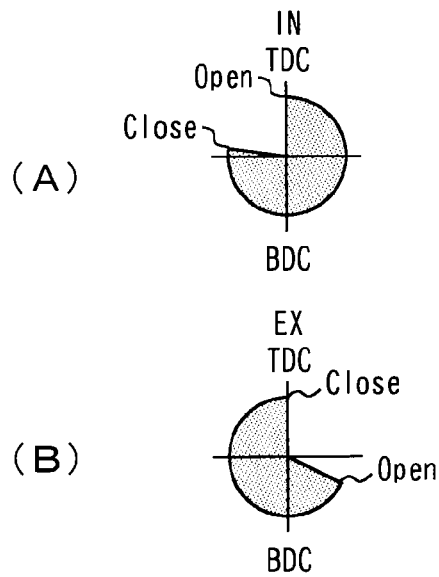
FIG. 16 is a diagram showing an example of the valve timings of intake and exhaust valves.

FIG. 15 is a diagram showing an operating condition of each cylinder in a case in which the crankshaft 78 stops rotating at a situation where the crank angle is 420° CA. Note that the crank angle at the timing when the piston 42 of No. 1 cylinder is positioned at the compression top dead center is herein defined as the crank angle CA of zero degree. In addition, FIG. 16 is a diagram showing an example of the valve timings of the intake and exhaust valves 58 and 60. Note that as shown in FIG. 16, shown herein as an example are the valve timings which are set in such a way that the intake valve 58 is closed during the compression stroke after being opened at the intake and exhaust top dead center (TDC) and the exhaust valve 60 is closed at the intake and exhaust top dead center after being opened during the expansion stroke.

The strokes surrounded by a circle in FIG. 15(A) corresponds to the stroke during which the intake valve 58 or the exhaust valve 60 is returned to the valve operable state even if the energization of the solenoid 132 for each cylinder is started at the restart. Note that the strokes surrounded by a square in FIG. 15(A) corresponds to the stroke that is affected concerning whether or not it is returned to the valve operable state depending on the settings of the piston stop position and valve timing at the time of the automatic stop. Specifically, if the projection part 122c of the slide pin 122 can be promptly inserted into the guide rail 128 by turning on the energization of the solenoid 132 at the restart, it becomes not needed to return to the valve operable state.

FIG. 15(B) is a diagram illustrating the order of the cylinders which comes to return to the valve operable state at the time of the restart in the case of above-described FIG. 15(A) separately for the intake side and the exhaust side. More specifically, the intake valve 58 is returned to the valve operable (lift) state in the order of No. 3 cylinder to No. 4 cylinder and to No. 2 cylinder even if the energization of the solenoid 132 for each cylinder is started at the time of the restart. However, as described above, No. 2 cylinder may not be returned depending on the piston stop position and valve timing at the time of the automatic stop. Note that the valve stop after the restart is possible as for No. 1 cylinder. Furthermore, the exhaust valve 60 is returned to the valve operable (lift) state in the order of No. 4 cylinder to No. 2 cylinder and to No. 1 cylinder. However, as described above, No. 1 cylinder may not be returned depending on the piston stop position and valve timing at the time of the automatic stop. Note that the valve stop after the restart is possible as for No. 1 cylinder.

In the present embodiment, in the case of above-described FIG. 15, No. 3 cylinder is selected as a cylinder that starts the start-up (combustion) first at the time of the restart from the automatic stop. In the case in which the internal combustion engine 12 is being automatically stopped, the electric power supply of the vehicle system continues to be turned on contrary to the case of being stopped in response to turning off the IG switch 76. Because of this, the ECU 40 can figure out the stop position of the piston 42 in each cylinder or the stop position of the crankshaft 80 on the basis of outputs of the crank angle sensor 70 or cam angle sensor 92 during the automatic stop. As a result, the ECU 40 can select No. 3 cylinder at the time of the restart and immediately start fuel supply and ignition, thereby start the start-up from No. 3 cylinder.

According to the above control at the time of the restart, even if the energization of the solenoid 132 is turned off during the automatic stop, it is possible to avoid fresh air from being introduced into the catalyst 66 at the time of the restart after that. This makes it possible to surely prevent the oxidation (degradation) of the catalyst 66 during the automatic stop and at the time of the restart while successfully reducing the electric power consumption by the above-described control of the solenoid 132 during the automatic stop. Furthermore, a prompt start-up without cranking can show promise in preventing occurrence of self-ignition.

Figure 17:
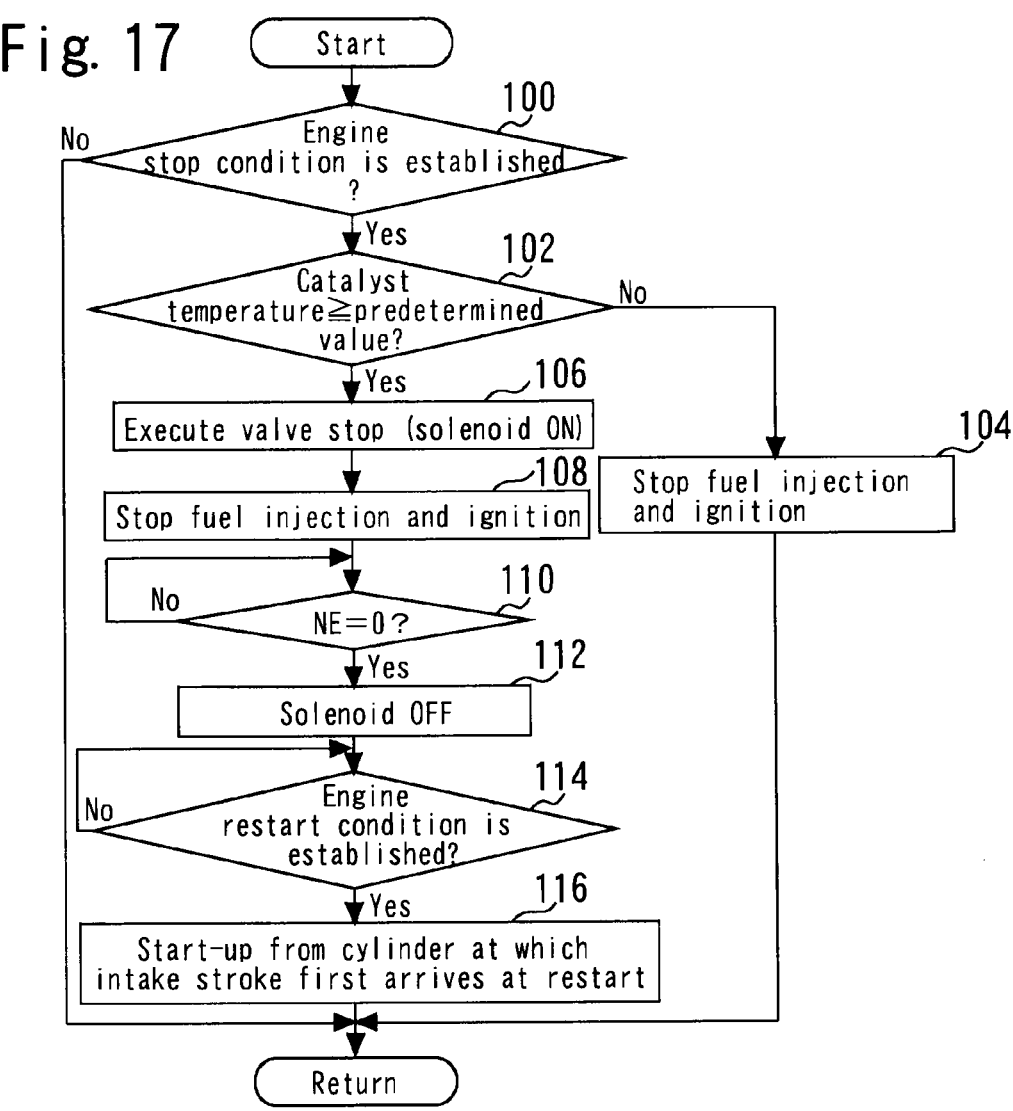
FIG. 17 is a flowchart illustrating a routine that is executed in the first embodiment of the present invention.

FIG. 17 is a flowchart of the routine to be executed by the ECU 40 in the present first embodiment to implement the above-described controls at the automatic stop and at the restart of the internal combustion engine 12. Note that in the main drive system 10 of the present embodiment, it is supposed that the crankshaft 78 is not rotated, as precondition for the processing of the present routine, in a case in which the vehicle is driven by the motor 14 at the time of the automatic stop of the internal combustion engine 12.

In the routine shown in FIG. 17, it is first determined whether or not a predetermined automatic stop condition of the internal combustion engine 12 is established (an automatic stop request is made) during power-up of the vehicle system on the basis of information from the various types of sensors connected to the ECU 40 (step 100).

As a result, if it is determined that the automatic stop condition is established, it is determined whether or not the temperature of the catalyst 66 is equal to or higher than a predetermined value (step 102). The predetermined value is a value preset as a threshold for determining whether occurrence of the degradation is possible in a situation where the air whose oxygen concentration is high is supplied to the catalyst 66. The temperature of the catalyst 66 can be estimated by acquiring an engine coolant temperature, engine load records and the like on the basis of the information from the various types of sensors. Note that the temperature of the catalyst 66 is not always acquired by use of the estimation method and may be measured by use of a sensor.

If it is determined in above-described step 102 that the temperature of the catalyst 66 is lower than the above-described predetermined value, fuel injection and ignition in each cylinder are stopped at a predetermined timing in order to stop the internal combustion engine 12 (step 104). If, on the other hand, it is determined that the temperature of the catalyst 66 is equal to or higher than the predetermined value, the energization of the solenoid 132 is turned on in order to maintain the intake and exhaust valves 58 and 60 of each cylinder in the closed state (step 106) and fuel injection and ignition in each cylinder are stopped (step 108).

Next, it is determined whether or not the engine speed NE has become zero in response to the processing of above-described steps 106 and 108 (step 110). Note that it is herein assumed that the arrangement is made such that the crankshaft 78 is not rotated at the time of the automatic stop of the internal combustion engine 10, and it is determined that when the determination of this step 110 is established, a case is established in which the rotation of the crankshaft 78 is stopped and the crankshaft 78 is not driven. However, if, for example, the connection between an internal combustion engine, and a motor or drive wheels is controlled with a clutch, it may be determined whether there is a case in which a crankshaft is not driven by an external power by additionally judging an operating state of the clutch in this step 110.

If it is determined in above-described step 110 that the engine speed NE has become zero, the energization of the solenoid 132 is turned off (step 112).

Next, it is determined whether or not the restart condition of the internal combustion engine 12 is established (that is, there is a restart request) on the basis of information from the various types of sensors connected to the ECU 40 (step 114). As a result of this, if it is determined that the restart condition is established, after the cylinder at which the intake stroke first arrives is identified on the basis of the output of the crank angle sensor 70 or the like at the time of the restart, and then the start-up (fuel injection and ignition) is started from that cylinder (step 116).

Meanwhile, in the first embodiment, which has been described above, in order to change the operational states of the valves 58 and 60, the arrangement is made such that the changeover pins 112, 118L and 118R are moved due to the fact that the guide rail 128 using the rotative power of the main cam 82 drives the slide pin 122 operating in the wake of the energization of the solenoid 132. However, the electrically-driven actuator of the present invention is not limited to the one that actuates the changeover pin indirectly as just described, if it is configured so as to put the first rocker arm and the second rocker arm into the connection state during de-energization and maintain the first rocker arm and the second rocker arm in the disconnection state by keeping energized. More specifically, for example, an arrangement is made such that a solenoid is placed at a position to be able to displace the changeover pins 112, 118L and 118R in their retreating direction, and then those changeover pins 112, 118L and 118R may be directly driven by the energization of the solenoid. Furthermore, the electrically-driven actuator may be, for example, an oil control valve (OCV) which is used in a configuration in which operational states of a valve are switched by hydraulic pressure controlled by the OCV, the energization of which is duty controlled.

Moreover, in the first embodiment, which has been described above, the arrangement is made such that the solenoids 132 are installed on the intake side and the exhaust side in all cylinders. However, in order to prevent air from being flown into the catalyst at the automatic stop, the present invention has only to have a configuration that can put at least one of the intake valve and the exhaust valve of each cylinder into the valve stop state. More specifically, if at least one of the intake valve and the exhaust valve of each cylinder are put into the valve stop state, fresh air is not flown through from the intake passage side to the exhaust passage side. Consequently, in the present embodiment, the solenoid 132 in each cylinder may be installed on only any one of the intake side and the exhaust side.

Note that in the first embodiment, which has been described above, the "energization control means" according to the above-described first aspect of the present invention, and the "energization stop execution means" according to the above-described first aspect of the present invention are implemented by the ECU 40 executing the processing of above-described steps 100 and 106, and the processing of above-described steps 110 and 112, respectively.

In addition, in the first embodiment, which has been described above, the return spring 120 corresponds to the "biasing means" according to the above-described second aspect of the present invention; and the slide pin 122 and the guide rail 128 to the "pin driving mechanism" according to the above-described second aspect of the present invention, respectively. Moreover, the "stop position determination means" according to the above-described second aspect of the present invention, and the "restart execution means" according to the above-described second aspect of the present invention are implemented by the ECU 40 determining the piston stop position of each cylinder on the basis of the outputs of the crank angle sensor 70 and the cam angle sensor 92, and executing the processing of above-described steps 114 and 116, respectively.

Second Embodiment

Next, a second embodiment of the present invention will be described with reference to FIGS. 18 to 20.

The system of the present embodiment can be implemented by using the hardware configuration shown in FIGS. 1 to 13 and causing the ECU 40 to execute the routine shown in FIG. 20 described below, in stead of the routine shown in FIG. 17.

In the present embodiment as well, an arrangement is made at the time of the automatic stop of the internal combustion engine 12 such that a valve stop control is performed which stop the intake and exhaust valves 58 and 60 of each cylinder in the closes state, and such that the energization of the solenoid 132 is turned off after the engine speed NE becomes zero. On that basis, the present embodiment is characterized by a timing that turns off the energization of the solenoid 132 after the engine speed NE becomes zero. Specifically, after the engine speed Ne becomes zero, an arrangement is made such that the energization of the solenoid 132 is continued if the cylinder pressure is equal to or less than a predetermined value, and such that the energization of the solenoid 132 is turned off if the cylinder pressure is higher than the above-mentioned predetermined value.

Moreover, in the present embodiment, in order to elevate the cylinder pressure to a sufficiently negative pressure immediately after the automatic stop of the internal combustion engine 12, the above-described valve stop control is performed in the following manner. More specifically, when the intake and exhaust valves 58 and 60 are stopped at the time of the automatic stop, the operation of the intake valve 58 is first stopped and then the exhaust valve 60 is stopped in each cylinder. In the exhaust valve timing shown in FIG. 16 (B) described above, the exhaust valve 60 is set so as to be stopped at the intake and exhaust top dead center. Consequently, if the operations of the intake and exhaust valves 58 and 60 are stopped in such a manner, the valve stop state is achieved after the gas inside the cylinder is sufficiently discharged into the exhaust passage 48 side.

Figure 18:
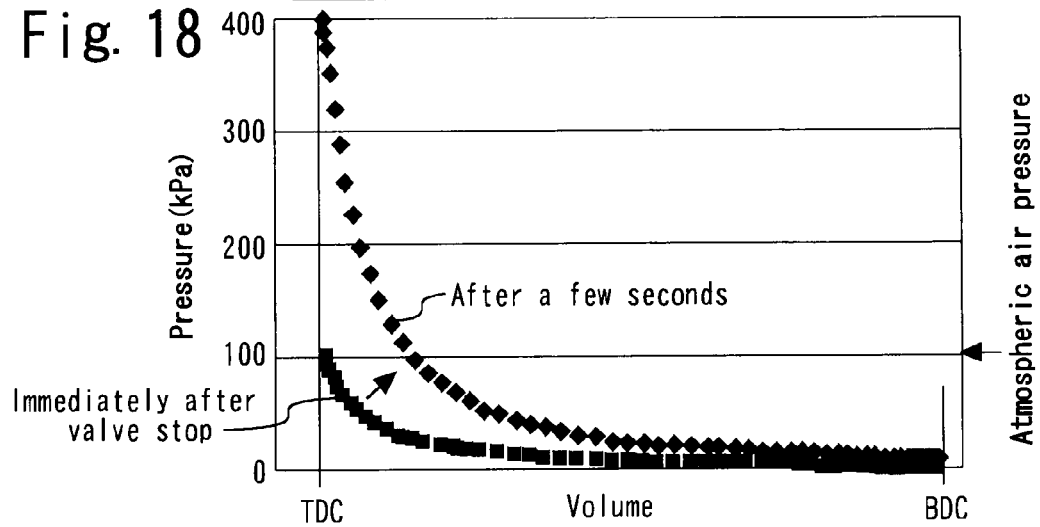
FIG. 18 is a P-V diagram attained when the rotation of the crankshaft is continued for a few seconds after a valve stop control is executed in a manner shown in the second embodiment of the present invention.

FIG. 18 is a P-V diagram attained when the rotation of the crankshaft 78 is continued for a few seconds after the valve stop control is executed in a manner described above.

If the valve stop control is executed in a manner described above, the cylinder pressure nearly equals the atmospheric air pressure under the situation where the piston 42 is located at the top dead center, while the cylinder pressure becomes significantly negative as the piston 42 descends toward the bottom dead center, as shown in FIG. 18, immediately after the valve stop.

Figure 19:
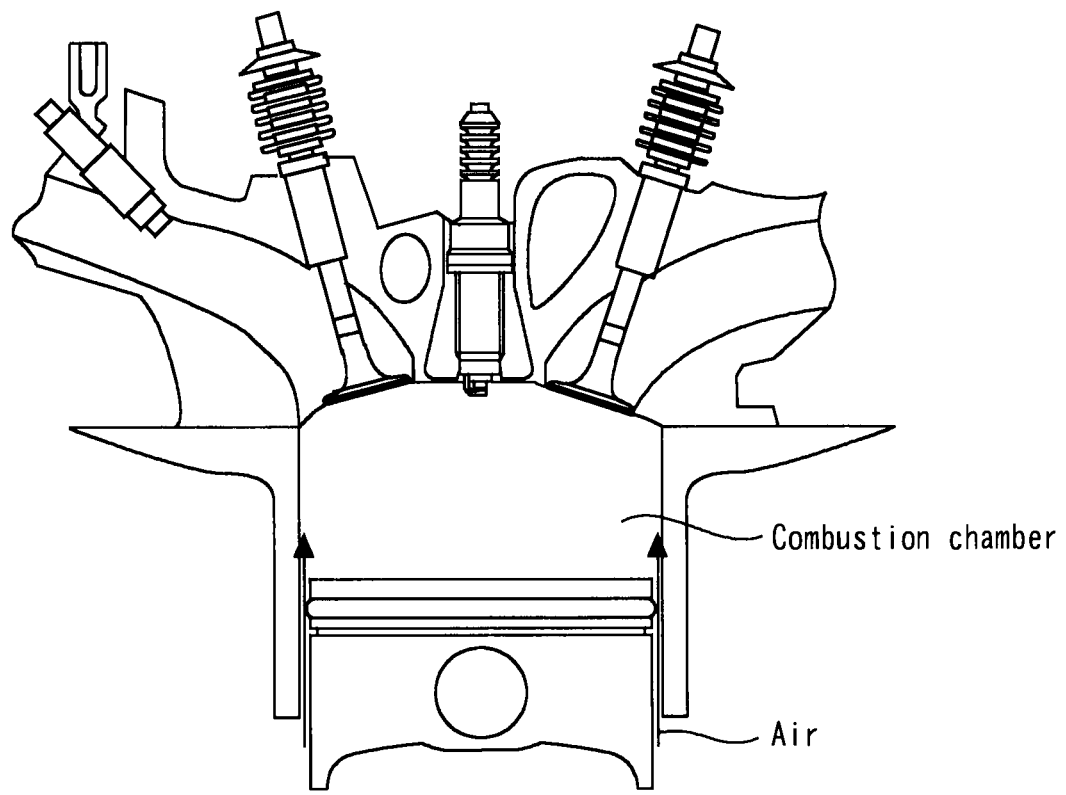
FIG. 19 is a diagram for explaining an airflow to the combustion chamber side from the crank chamber side in a case in which a negative pressure is generated in a cylinder.

FIG. 19 is a diagram for explaining an airflow to the combustion chamber 44 side from the crank chamber side in a case in which a negative pressure is generated in the cylinder.

If the negative pressure is generated in the cylinder (in the combustion chamber), as shown in FIG. 19, an air in the crank chamber (not shown) is flown into the combustion chamber through the gap between the piston 42 and the cylinder wall surface. As a result of this, during reciprocating motions of the piston 42 shown in above-described FIG. 18, an amount of the air compressed by the piston 42 increases for a while with time. For this reason, as shown in FIG. 18, the cylinder pressure comes to increase with time.

As described so far, it is revealed that the cylinder pressure becomes significantly negative immediately after the valve stop if the valve stop control is executed in a manner described above at the time of the automatic stop. Further, in the present embodiment, an arrangement is made such that if the rotation of the crankshaft 78 is stopped at the time of the automatic stop, the stop position of the piston 42 in each cylinder is adjusted nearly midway between the top dead center and the bottom dead center by driving the crankshaft 78 with the use of the generator 16.

As shown in above-mentioned FIG. 14, the operation of the automatic stop itself is completed in several tenths of a second. Immediately after the above-described adjustment of the piston stop position is performed after the rotation of the crankshaft 78 is stopped, therefore, the cylinder pressure becomes sufficiently negative. As described at the beginning of the second embodiment, in the present embodiment, the energization of the solenoid 132 is continued in the situation where the cylinder pressure becomes significantly negative like this. Further, the energization of the solenoid 132 is turned off when the cylinder pressure has approached the atmospheric air pressure due to the flow of the air from the crank chamber to the cylinder with the time course after that.

By performing the energization control of the solenoid 132 as described above, the energization of the solenoid 132 is continued when the restart is performed in a situation where the cylinder pressure is low, thereby preventing the return to the valve operable state from being performed at the first cycle of each cylinder after the restart even if the variable valve operating apparatus 62 of the present embodiment is used. As a result of this, it becomes possible to prevent the air from being not introduced into the cylinders (In the example of FIG. 15(A), No. 3 cylinder and No. 4 cylinder, and further No. 2 cylinder with the above-described conditions) at which the intake stroke arrives during the first cycle, and thus the inside of the combustion chambers 44 of those cylinders can be maintained under negative pressure. This makes it possible to successfully reduce a load needed for cranking (a power consumption of the generator 16 functioning as a starter)

compared with a case of returning to the valve operable state (a case of turning off the energization of the solenoid 132) at the first cycle after the restart.

Moreover, in the present embodiment, the arrangement is made such that if the rotation of the crankshaft 78 is stopped at the time of the automatic stop, the stop position of the piston 42 in each cylinder is adjusted nearly midway between the top dead center and the bottom dead center. If the piston 42 of each cylinder is stopped naturally without such consideration, in, for example, the cylinder in which the piston 42 stops near the bottom dead top center, the load needed for the cranking becomes large as the air quantity inside the cylinder increases with time after the automatic stop. Contrary to this, the load needed for the cranking can be reduced because the above-mentioned consideration for the stop position of the piston 42 is given. In addition, the vibration associated with the execution of the cranking can be also reduced.

Figure 20:
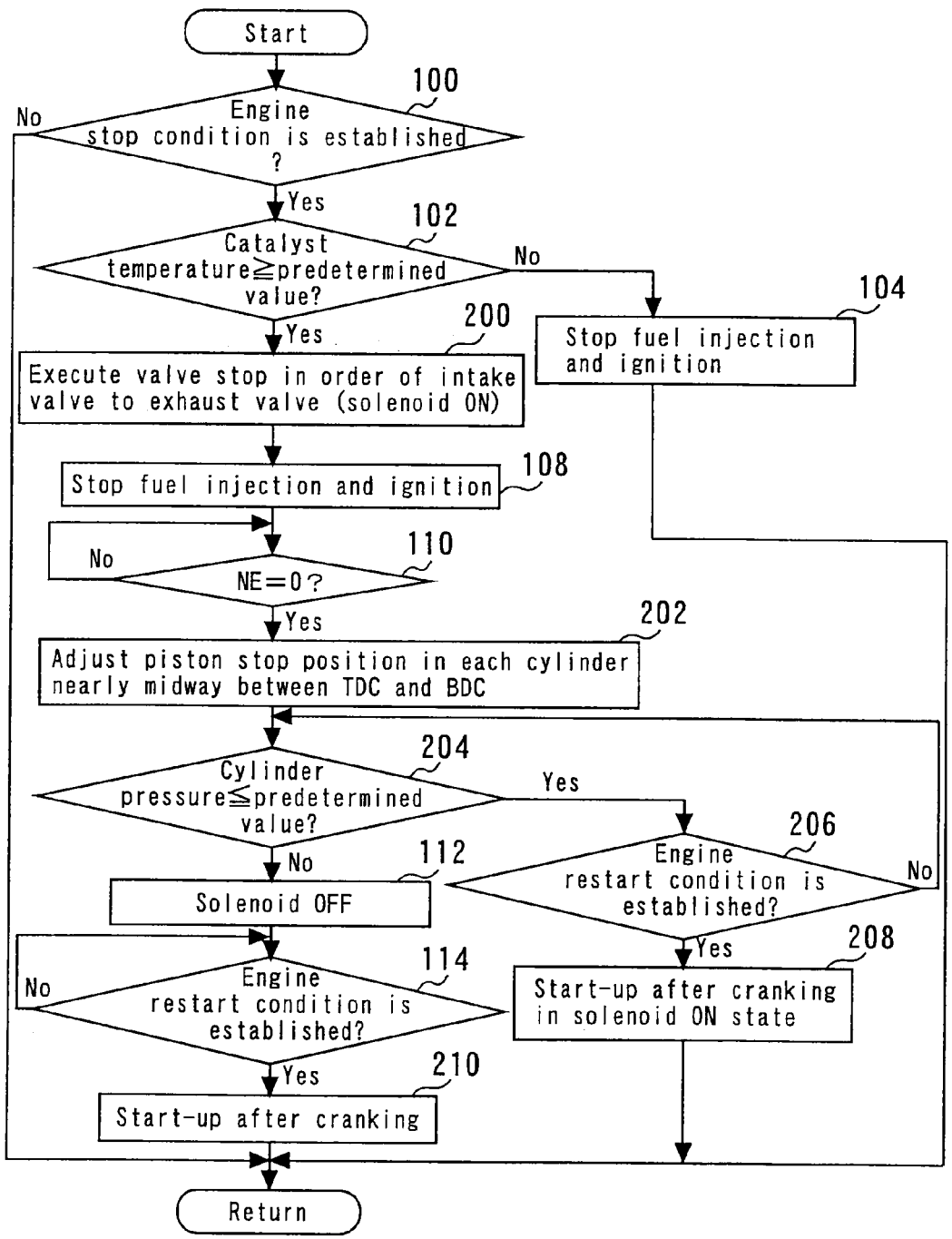
FIG. 20 is a flowchart illustrating a routine that is executed in the second embodiment of the present invention.

FIG. 20 is a flowchart of the routine to be executed by the ECU 40 in the present second embodiment to implement the above-described function. Note that in FIG. 20, the same steps as those in FIG. 17 in the first embodiment will be assigned with the same reference numerals and the descriptions therefor will be omitted or simplified.

In the routine shown in FIG. 20, if it is determined that the automatic stop condition is established and the catalyst 66 has a high temperature in steps 100 and 102, the energization of the solenoid 132 is turned on in the order in which the valve stop of the intake and exhaust valves 58 and 60 of each cylinder is completed by closing the exhaust valve 60 at the intake and exhaust top dead center after the intake valve 58 is closed (step 200); and fuel injection and ignition in each cylinder are stopped (step 108).

Next, if it is determined in above-described step 110 that the engine speed NE has become zero, the rotation position of the crankshaft 78 is adjusted with the use of the generator 16 so that the stop position of the piston 42 in each cylinder is adjusted nearly midway between the top dead center and the bottom dead center (step 202).

Next, it is determined whether or not the cylinder pressure in each cylinder is equal to or less than a predetermined value (step 204). The predetermined value in step 204 is set to be a value of negative pressure value near the atmospheric air pressure. The cylinder pressure in each cylinder approaches the atmospheric air pressure as the time elapses after the automatic stop. As a result of this, the load needed for cranking in the valve stop state increase as the time elapses. Therefore, the predetermined value is set such that a saving amount of an energy needed for the cranking does not fall below an amount of electricity consumed by continuing the energization of the solenoid 132.

If it is determined in above-described step 204 that the cylinder pressure in each cylinder is equal to or less than the above-described predetermined value, it is determined whether or not the restart condition of the internal combustion engine 12 is established (step 206). As a result of this, if the restart request made in a state in which the cylinder pressure is equal to or less than the above-described predetermined value, the start-up (fuel injection and ignition) of the internal combustion engine 12 is performed with cranking of predetermined cycle numbers in a state in which the energization of the solenoid 132 is continued (step 208).

If, on the other hand, it is determined in above described step 204 that the cylinder pressure in each cylinder becomes higher than the predetermined value, the energization of the solenoid 132 is turned off (step 112). After that, if the restart condition is established in step 114, the start-up (fuel injection and ignition) of the internal combustion engine 12 is performed with cranking of predetermined cycle numbers (step 210).

Meanwhile, in the second embodiment, which has been described above, it is judged, using the outputs of the cylinder pressure sensor 74 equipped with each cylinder, whether or not the cylinder pressure in each cylinder is equal to or less than the above-described predetermined value after the completion of the automatic stop, so that a timing of turning off the energization of the solenoid 132 is determined. However, the method of judging such a timing is not limited to the one as performed using the output of the cylinder pressure sensor 74, and may be, for example, the one as judged whether or not elapsed time after the completion of the automatic stop of the internal combustion engine 12 reaches a predetermined value.

Moreover, in the second embodiment, which has been described above, the arrangement is made such that the stop position of the piston 42 of each cylinder is adjusted nearly midway between the top dead center and the bottom dead center after the completion of the automatic stop. Furthermore, the arrangement is made such that the valve stop operation of the exhaust valve 60 is completed in a situation in which the intake and exhaust top dead center comes. This enables the cylinder pressure in each cylinder to be a nearly even negative pressure after the automatic stop because the internal combustion engine 12 is a four-cylinder engine in which explosion intervals are uniform. In contrary to this, if the piston 42 of each cylinder is stopped naturally without the adjustment of the above-described piston stop position, it is only necessary to detect a negative pressure during the automatic stop in a cylinder in which the piston 42 has stopped at a position sufficiently far from the top dead center, in order to determine a timing at which the energization of the solenoid 132 is turned off.

Note that in the second embodiment, which has been described above, the "cylinder pressure determination means" according to the above-described third aspect of the present invention, and the "energization continuation execution means" according to the above-described third aspect of the present invention are implemented by the ECU 40 executing the processing of above-described step 204, and not turning off the energization of the solenoid 132 in the case in which the determination of above-described step 204 is positive, respectively.

In addition, in the second embodiment, which has been described above, the "energization order setting means" according to the above-described fourth aspect of the present invention is implemented by the ECU 40 executing the processing of above-described steps 100 and 200.

Third Embodiment

Next, a third embodiment of the present invention will be described with reference to FIGS. 21 and 22.

The system of the present embodiment can be implemented by using the hardware configuration shown in FIGS. 1 to 13 and causing the ECU 40 to execute the routine shown in FIG. 22 described below, in stead of the routine shown in FIG. 17.

As already described with reference to above-described FIG. 19, if the pressure inside the combustion chamber is negative during the automatic stop of the internal combustion engine 12, air is flown into the combustion chamber 44 from the crank chamber side. Typically in the internal combustion engine, the arrangement is made so as to allow fresh air to circulate inside the crank chamber for the purpose of scavenging blow-by gas flown into the crank chamber side from the combustion chamber 44 side during combustion. Because of this, the gas flown into the combustion chamber 44 side from the crank chamber side during the automatic stop becomes a gas whose oxygen concentration is high. Therefore, if the exhaust valve 60 is to be opened immediately after the restart is started, the gas which is remaining in the cylinder during the automatic stop and has a high oxygen concentration comes to be exhausted.

Figure 21:
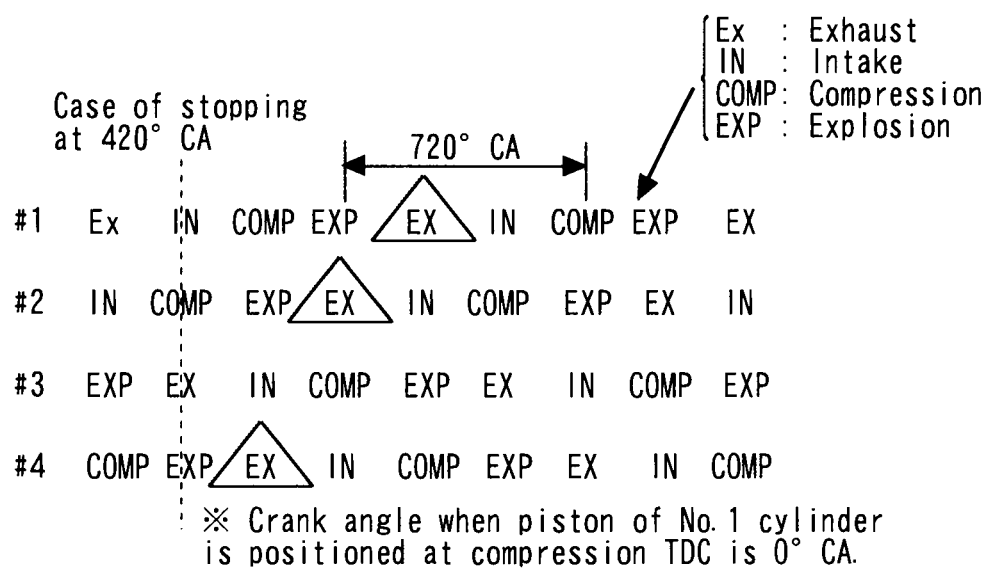
FIG. 21 is a diagram showing operating conditions of each cylinder in a case in which the crankshaft stops rotating at a situation where the crank angle is 420° CA.

FIG. 21 is a diagram showing operating conditions of each cylinder in a case in which the crankshaft 78 stops rotating at a situation where the crank angle is 420° CA. Note that FIG. 21 shows the same relation as that in above-described FIG. 15(A) as an example.

As described above, in the configurations of the variable valve operating apparatuses 62, 64 in the present embodiment, if the energization of the solenoid 132 is once turned off during the automatic stop of the internal combustion engine 12, the exhaust valve 60 is returned to the valve operable state as for the exhaust strokes surrounded by a triangle in FIG. 21 (that is to say, the exhaust strokes for No. 4 cylinder and No. 2 cylinder, and further No. 1 cylinder with conditions) even if the solenoid 132 is energized at the restart. As a result of this, there is a concern that air may be supplied to the catalyst 66 from those cylinders at the time of the restart.

Accordingly, in the present embodiment, as for the cylinders in which the expansion stroke, the compression stroke and further the intake stroke comes at the completion of the automatic stop, an arrangement is made so as to exceptionally continue the energization of the solenoid 132 for controlling the exhaust valve 60 even if the engine speed NE has become zero during the automatic stop. That is to say, as for the exhaust valves 60 for those cylinders, an arrangement is made so as to continue the valve stop state after the completion of the automatic stop.

Performing the energization control of the exhaust side solenoid 132 as described above can prevent the exhaust valves 60 targeted for the energization control from being returned to the valve operable state at the first cycle of each cylinder after the restart, even if the variable valve operating apparatuses 62, 64 of the present embodiment are used. In addition, the exhaust valve 60 of the cylinder during the exhaust stroke at the time of the automatic stop (No. 3 cylinder in the example of FIG. 21) is maintained in the closed state until the exhaust stroke, which is not completed during the automatic stop, is completed at the time of the restart. Further, the exhaust valve 60 of the cylinder in which the exhaust stroke first comes after that can be put into the valve stop state by immediately energizing the solenoid 132 at the time of the restart. Furthermore, above-mentioned No. 3 cylinder corresponds to the first start-up cylinder by the start-up operation at the time of the restart in the first embodiment described above. This makes it possible to prevent the air from being flown into the catalyst 66 without any combustion even if the start-up operation is also performed in the present embodiment.

As described so far, performing the energization control of the exhaust side solenoid 132 described above makes it possible to surely prevent the air, which is sucked up to the combustion chamber 44 from the crank chamber side during the automatic stop, from being supplied to the catalyst 66 from each cylinder at the time of the restart.

In addition, even if the energization control of the exhaust side solenoid 132 described above is performed, it is possible to turn off the energization of five solenoids 132 of totally eight solenoids 132 each equipped with the intake and exhaust side of the four cylinders at the time of the automatic stop, while suppressing the deterioration of the catalyst 66. As a result of this, a sufficient energy saving effect can be obtained and thus the fuel economy of the internal combustion 12 can be improved.

Figure 22:
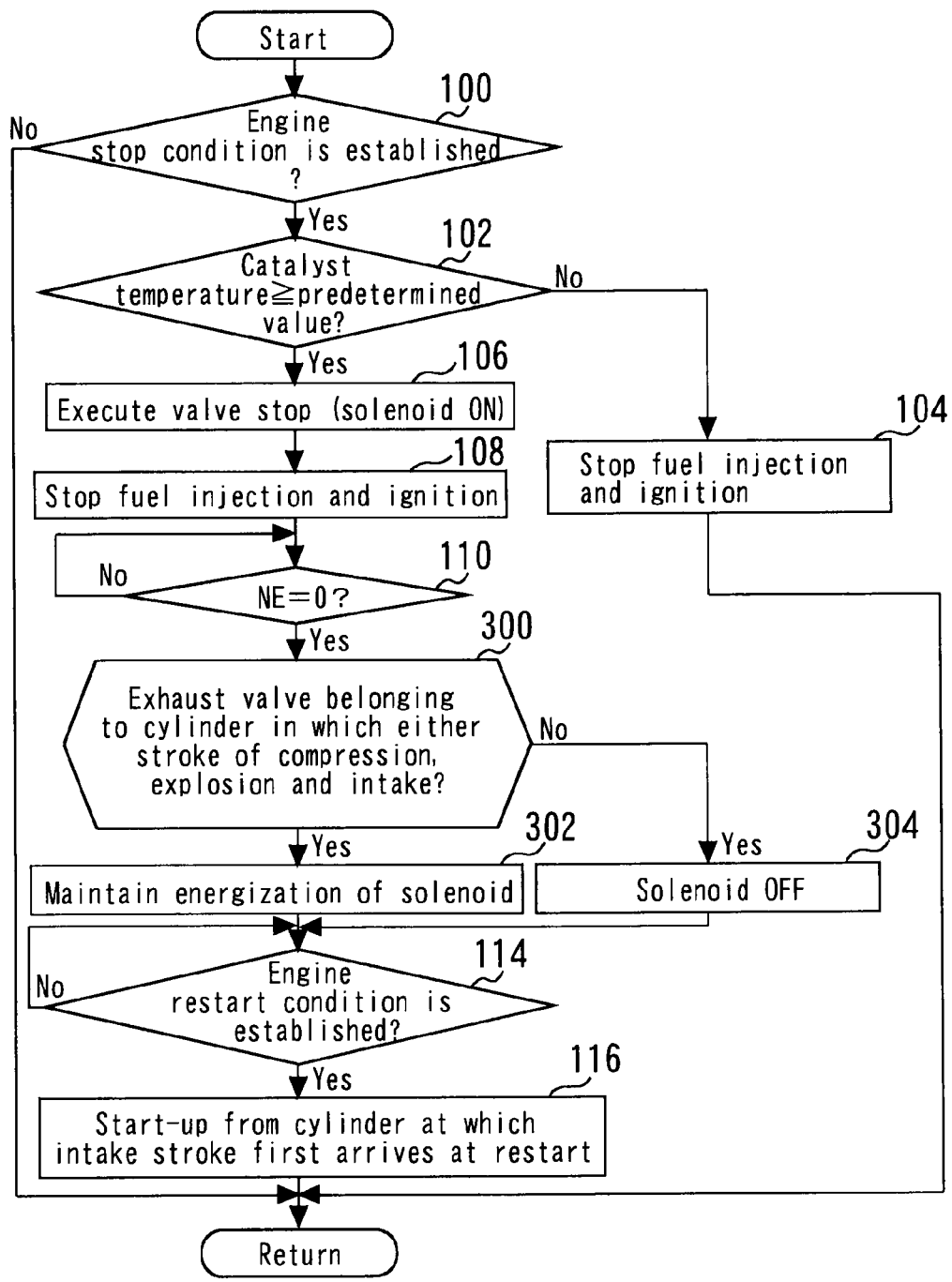
FIG. 22 is a flowchart illustrating a routine that is executed in the third embodiment of the present invention.

FIG. 22 is a flowchart of the routine to be executed by the ECU 40 in the present third embodiment to implement the above-described function. Note that in FIG. 22, the same steps as those in FIG. 17 in the first embodiment will be assigned with the same reference numerals and the descriptions therefor will be omitted or simplified.

In the routine shown in FIG. 22, if it is determined in step 110 that the engine speed NE has become zero at the time of the automatic stop, a determination is made on whether or not there is the exhaust valve 60 belonging to a cylinder in which either of the compression stroke, expansion stroke and intake stroke comes during the automatic stop, or the other valves 58 and 60 (step 300).

As a result of that, as for the exhaust valve 60 belonging to the cylinder in which either of the compression stroke, expansion stroke and intake stroke comes during the automatic stop, the energization of the solenoid 132 playing a role in controlling the exhaust valve 60 is continued (step 302). On the other hand, as for the valves other than the above-mentioned exhaust valve 60 (that is to say, the exhaust valve 60 belonging to the cylinder in which the exhaust stroke comes during the automatic stop, and the intake valves 58 of all cylinders), the energization of the solenoids 132 playing a role in controlling those valves 58 and 60 is turned off (step 304). Note that description of the process of steps 114 and 116 thereafter are omitted.

Meanwhile, in the third embodiment, which has been described above, the arrangement is made such that the energization of the solenoid 132 is continued as for the exhaust valve 60 belonging to the cylinder in which either of the compression stroke, expansion stroke and intake stroke comes during the automatic stop of the internal combustion engine 12. As already described, however, as for the exhaust valves 60 belonging to the cylinder in which the intake stroke comes in this case, the operation of the exhaust valve 60 during the first exhaust stroke may be stopped by performing the energization of the solenoid 132 immediately at the time of the restart, depending on the piston stop position or the valve timing of the exhaust valve 60. Therefore, in the process of the routine shown in above-described FIG. 22, an arrangement may be made such that it is judged more exactly whether or not the energization of the solenoid 132 for playing a role in controlling this exhaust valve 60 is required, and the energization of the solenoid 132 may be stopped if it is not required.

In addition, the energization control of the exhaust side solenoid 132 according to the above-described third embodiment may be performed with the energization control of the solenoid 132 according to the above-described second embodiment.

Furthermore, in the third embodiment described above, the solenoids 132 are installed on the intake and exhaust side of all cylinders. However, in order to prevent air from being flown into the catalyst during the automatic stop, the present invention has only to have a configuration that can put at least one of the intake valve and the exhaust valve of each cylinder into the valve stop state. Consequently, in the present embodiment, the solenoid 132 may be installed on only the exhaust side of all cylinders.

Note that in the third embodiment, which has been described above, the "exhaust side energization continuation execution means" according to the above-described fifth aspect of the present invention is implemented by the ECU 40 executing the processing of above-described steps 110, 300 and 302.

Meanwhile, in the first to third embodiments, which have been described above, the description has been made taking an example of the variable valve operating apparatuses 62 and 64 which are used for the internal combustion engine 12 mounted in a hybrid vehicle. However, the internal combustion engine targeted for the present invention is not limited to the one mounted in the hybrid vehicle, and may be, for example, the one mounted in a vehicle that has an idling stop function during power-up of the vehicle, provided that it automatically stops in a case in which a predetermined stop condition is established during the power-up of a vehicle system and automatically restarts in a case in which a predetermined restart condition is established.

The invention claimed is:

1. A variable valve operating apparatus for an internal combustion engine, the variable valve operating apparatus that is used for the internal combustion engine executing an automatic stop in a case in which a predetermined stop condition is established during power-up of a vehicle system, while automatically restarting in a case in which a predetermined restart condition is established, and that is for changing operational states of at least one valve of an intake valve and an exhaust valve between a valve operable state and a valve stop state in each cylinder of the internal combustion engine,
   wherein the variable valve operating apparatus comprises an electrically-driven actuator which is arranged such that the operational state of the at least one valve becomes the valve operable state during de-energization and so as to maintain the valve stop state by keeping energized,
   wherein the variable valve operating apparatus comprises energization control means which performs energization of the electrically-driven actuator for each cylinder in a case in which fuel supply to the internal combustion engine is stopped in response to an establishment of the predetermined stop condition, and
   wherein the energization control means includes energization stop execution means that stops the energization of the electrically-driven actuator for each cylinder in a case in which a crankshaft of the internal combustion engine stops rotating during an energization time period of the electrically-driven actuator and in which the crankshaft is not driven by an external power.

2. The variable valve operating apparatus for the internal combustion engine according to claim 1,
   wherein the variable valve operating apparatus further comprises:
   a first rocker arm which oscillates in synchronicity with a cam of the internal combustion engine;
   a second rocker arm which is capable of pressing the intake valve or the exhaust valve; and
   a changeover mechanism which includes a changeover pin disposed to be insertable to a pin hole formed in the first rocker arm and the second rocker arm respectively, and which is for switching between a connection state in which the first rocker arm and the second rocker arm are in connection with each other via the changeover pin and a disconnection state in which the connection is released,
   wherein the electrically-driven actuator performs an operation to move the changeover pin directly or indirectly, and
   wherein the changeover mechanism creates the connection state during de-energization of the electrically-driven actuator and maintains the disconnection state by keeping the actuator energized.

3. The variable valve operating apparatus for the internal combustion engine according to claim 2,
   wherein the changeover mechanism includes:
   biasing means which biases the changeover pin toward a position in the connection state from a position in the disconnection state; and
   a pin driving mechanism which displaces, with an aid of a rotative power of the cam, the changeover pin to the position in the disconnection state from the position in the connection state against a biasing force generated by the biasing means in response to an operation of the actuator at an energization,
   wherein the pin driving mechanism is arranged such that when the energization of the actuator is stopped, a force to press the changeover pin toward the position in the disconnection state disappears, and
   wherein the variable valve operating apparatus further comprises:
   stop position determination means which determines a piston stop position of each cylinder in a stopped state of the internal combustion engine; and
   restart execution means which executes a start-up from a cylinder at which an intake stroke first arrives when the internal combustion engine restarts in response to an establishment of the predetermined restart condition.

4. The variable valve operating apparatus for the internal combustion engine according to claim 3,
   wherein the variable valve operating apparatus is an apparatus which is for changing the operational states of at least the exhaust valve of the intake valve and the exhaust valve between the valve operable state and the valve stop state on a cylinder to cylinder basis in each cylinder of the internal combustion engine, and
   wherein the energization control means includes exhaust side energization continuation execution means that maintains the energization of the electrically-driven actuator playing a role in controlling the exhaust valve for a cylinder in which a piston is put in at least one of a compression stroke and an expansion stroke out of the compression stroke, the expansion stroke and an intake stroke when the crankshaft stops rotating during the energization time period.

5. The variable valve operating apparatus for the internal combustion engine according to claim 2,
   wherein the variable valve operating apparatus is an apparatus which is for changing the operational states of both the intake valve and the exhaust valve between the valve operable state and the valve stop state in each cylinder of the internal combustion engine,
   wherein the changeover mechanism includes:
   biasing means which biases the changeover pin toward a position in the connection state from a position in the disconnection state; and
   a pin driving mechanism which displaces, with an aid of a rotative power of the cam, the changeover pin to the position in the disconnection state from the position in the connection state against a biasing force generated by the biasing means in response to an operation of the electrically-driven actuator at an energization,
   wherein the pin driving mechanism is arranged such that when the energization of the actuator is stopped, a force to press the changeover pin toward the position in the disconnection state disappears, wherein the variable valve operating apparatus further comprises cylinder pressure determination means which determines whether or not a cylinder pressure in at least one cylinder of the internal combustion engine is equal to or less than a predetermined value after the crankshaft stops rotating during the energization time period, and wherein the energization stop execution means includes energization continuation execution means which maintains the energization of the actuator for each cylinder in a case in which the cylinder pressure in the at least one cylinder is equal to or less than the predetermined value after the crankshaft stops rotating during the energization time period.

6. The variable valve operating apparatus for the internal combustion engine according to claim 5, wherein the energization control means includes energization order setting means which performs the energization of the electrically-driven actuator for each cylinder in order of the electrically-driven actuator playing a role in controlling the intake valve to the actuator playing a role in controlling the exhaust valve in a case in which the fuel supply to the internal combustion engine is stopped in response to the establishment of the predetermined stop condition, and wherein the variable valve operating apparatus is set so that a closing timing of the exhaust valve when the exhaust valve is stopped by the energization of the electrically-driven actuator becomes a timing near a top dead center.

7. The variable valve operating apparatus for the internal combustion engine according to claim 5, wherein the variable valve operating apparatus is an apparatus which is for changing the operational states of at least the exhaust valve of the intake valve and the exhaust valve between the valve operable state and the valve stop state on a cylinder to cylinder basis in each cylinder of the internal combustion engine, and wherein the energization control means includes exhaust side energization continuation execution means that maintains the energization of the actuator playing a role in controlling the exhaust valve for a cylinder in which a piston is put in at least one of a compression stroke and an expansion stroke out of the compression stroke, the expansion stroke and an intake stroke when the crankshaft stops rotating during the energization time period.

8. A variable valve operating apparatus for an internal combustion engine, the variable valve operating apparatus that is used for the internal combustion engine executing an automatic stop in a case in which a predetermined stop condition is established during power-up of a vehicle system, while automatically restarting in a case in which a predetermined restart condition is established, and that is for changing operational states of at least one valve of an intake valve and an exhaust valve between a valve operable state and a valve stop state in each cylinder of the internal combustion engine, wherein the variable valve operating apparatus comprises an electrically-driven actuator which is arranged such that the operational state of the at least one valve becomes the valve operable state during de-energization and so as to maintain the valve stop state by keeping energized, wherein the variable valve operating apparatus comprises an energization control device which performs energization of the actuator for each cylinder in a case in which fuel supply to the internal combustion engine is stopped in response to an establishment of the stop condition, and wherein the energization control device includes an energization stop execution device that stops the energization of the electrically-driven actuator for each cylinder in a case in which a crankshaft of the internal combustion engine stops rotating during an energization time period of the electrically-driven actuator and in which the crankshaft is not driven by an external power.

* * * * *